(12) United States Patent
Murphy et al.

(10) Patent No.: US 11,891,173 B2
(45) Date of Patent: Feb. 6, 2024

(54) AIRCRAFT WING UNIT WITH PRESSURE FENCE

(71) Applicant: BOMBARDIER INC., Dorval (CA)

(72) Inventors: Michael Murphy, Whitby (CA); Jack Araujo, Ajax (CA); Gary Shum, Mississauga (CA); George Bradley, Montreal (CA)

(73) Assignee: BOMBARDIER INC., Dorval (CA)

( * ) Notice: Subject to any disclaimer, the term of this patent is extended or adjusted under 35 U.S.C. 154(b) by 202 days.

(21) Appl. No.: 16/608,978

(22) PCT Filed: Apr. 26, 2018

(86) PCT No.: PCT/IB2018/052906
§ 371 (c)(1),
(2) Date: Oct. 28, 2019

(87) PCT Pub. No.: WO2018/203189
PCT Pub. Date: Nov. 8, 2018

(65) Prior Publication Data
US 2020/0055584 A1   Feb. 20, 2020

Related U.S. Application Data

(60) Provisional application No. 62/492,583, filed on May 1, 2017.

(51) Int. Cl.
*B64C 3/58* (2006.01)
*B64F 5/10* (2017.01)
(Continued)

(52) U.S. Cl.
CPC .................. *B64C 3/58* (2013.01); *B64C 1/06* (2013.01); *B64C 1/26* (2013.01); *B64F 5/10* (2017.01)

(58) Field of Classification Search
CPC .... B64C 1/26; B64C 3/58; B64C 1/06; B64C 3/187; B64F 5/10
See application file for complete search history.

(56) References Cited

U.S. PATENT DOCUMENTS 2,294,359 A   7/1939   Best
2,211,089 A   8/1940   Berlin
(Continued)

FOREIGN PATENT DOCUMENTS

CN   101323370 A   12/2008

OTHER PUBLICATIONS

PCT international Search Report and Written Opinion dated Jul. 3, 2018 re: International Application No. PCT/IB2018/052906.
(Continued)

*Primary Examiner* — Richard Green
*Assistant Examiner* — Ashesh Dangol
(74) *Attorney, Agent, or Firm* — Norton Rose Fulbright Canada LLP

(57) ABSTRACT

Assemblies and methods for facilitating the assembly of aircraft wings to a fuselage are disclosed. In some embodiments, a wing unit includes features that are configured to define one of more parts of a pressure vessel that is partially defined by the fuselage portion. In some embodiments, the aircraft assemblies disclosed herein comprise one or more first structural interfaces that permit positional adjustment between the wing unit and the fuselage portion so that one or more second structural interfaces may be finished only after such positional adjustment. In some embodiments, the aircraft assemblies disclosed herein comprise one or more structural interfaces that are disposed outside of the wing unit in order to eliminate or reduce the need for assembly
(Continued)

personnel to access the interior of the wing unit to carry out the structural assembly of the wing unit to the fuselage portion.

6 Claims, 19 Drawing Sheets

(51) Int. Cl.
  *B64C 1/06* (2006.01)
  *B64C 1/26* (2006.01)

(56) References Cited

U.S. PATENT DOCUMENTS

| | | | |
|---|---|---|---|
| 7,887,009 B2 | 2/2011 | Keeler, Jr. et al. | |
| 8,356,773 B2 | 1/2013 | Gross | |
| 8,770,518 B2 | 7/2014 | Guittard et al. | |
| 8,899,520 B2 | 12/2014 | Barmichev et al. | |
| 9,221,236 B1* | 12/2015 | Rotter | B32B 37/00 |
| 2008/0283666 A1 | 11/2008 | Grieve et al. | |
| 2010/0301165 A1* | 12/2010 | Gross | B64C 1/26 |
| | | | 244/121 |
| 2011/0147521 A1 | 6/2011 | Delahaye et al. | |
| 2014/0084110 A1 | 3/2014 | Rea | |
| 2015/0014484 A1* | 1/2015 | Zeon | B64C 1/26 |
| | | | 244/131 |

OTHER PUBLICATIONS

English translation of Chinese patent document No. CN101323370A dated Dec. 17, 2008, https://patents.google.com/patent/CN101323370A/en?oq=CN101323370, accessed on Sep. 26, 2019.
Anonymous, Wing Fence—Wikipedia, https://web.archive.org/web/20170331131354/https://en.wikipedia.org/wiki/Wing_fence, retrieved on Jun. 15, 2018.

* cited by examiner

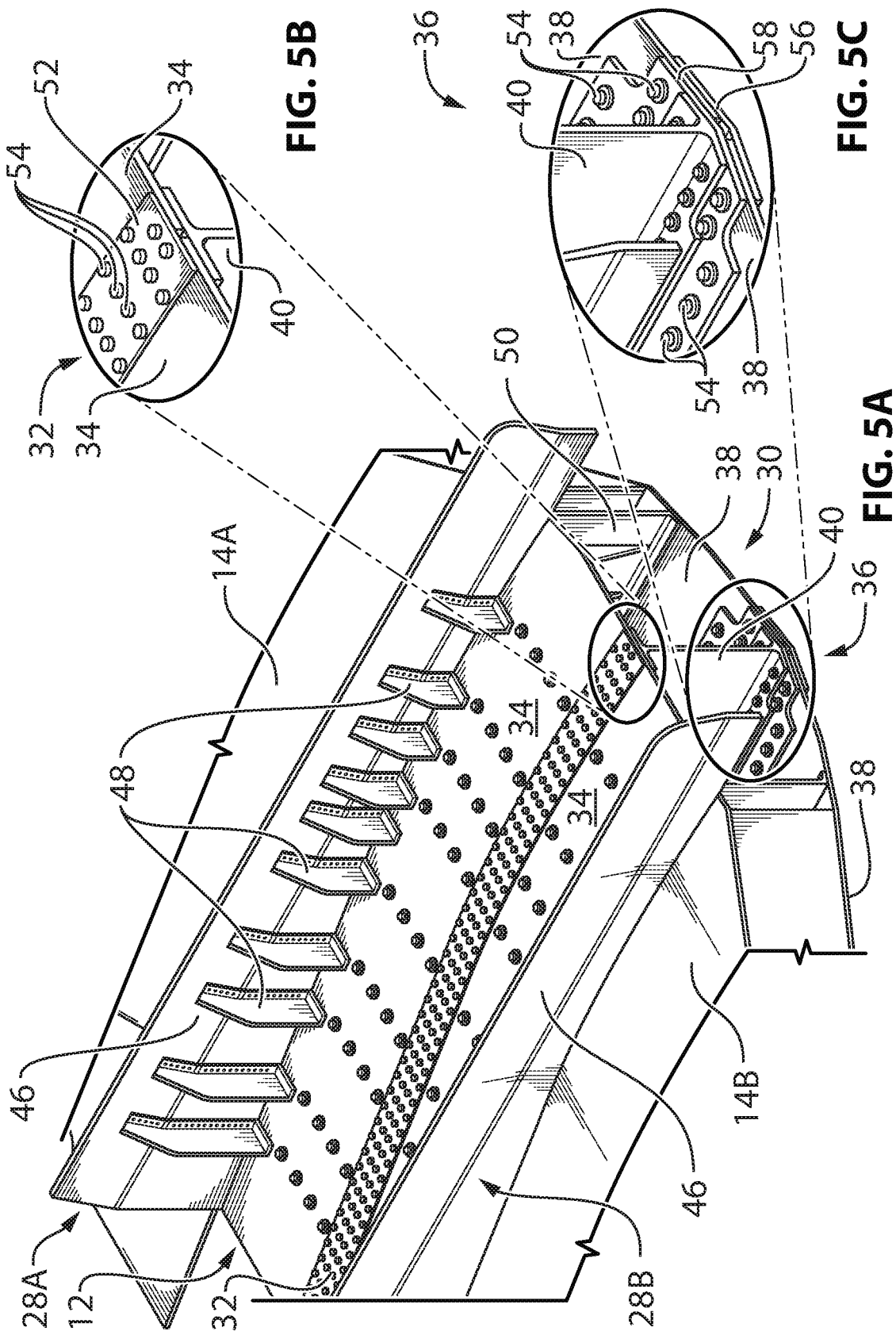

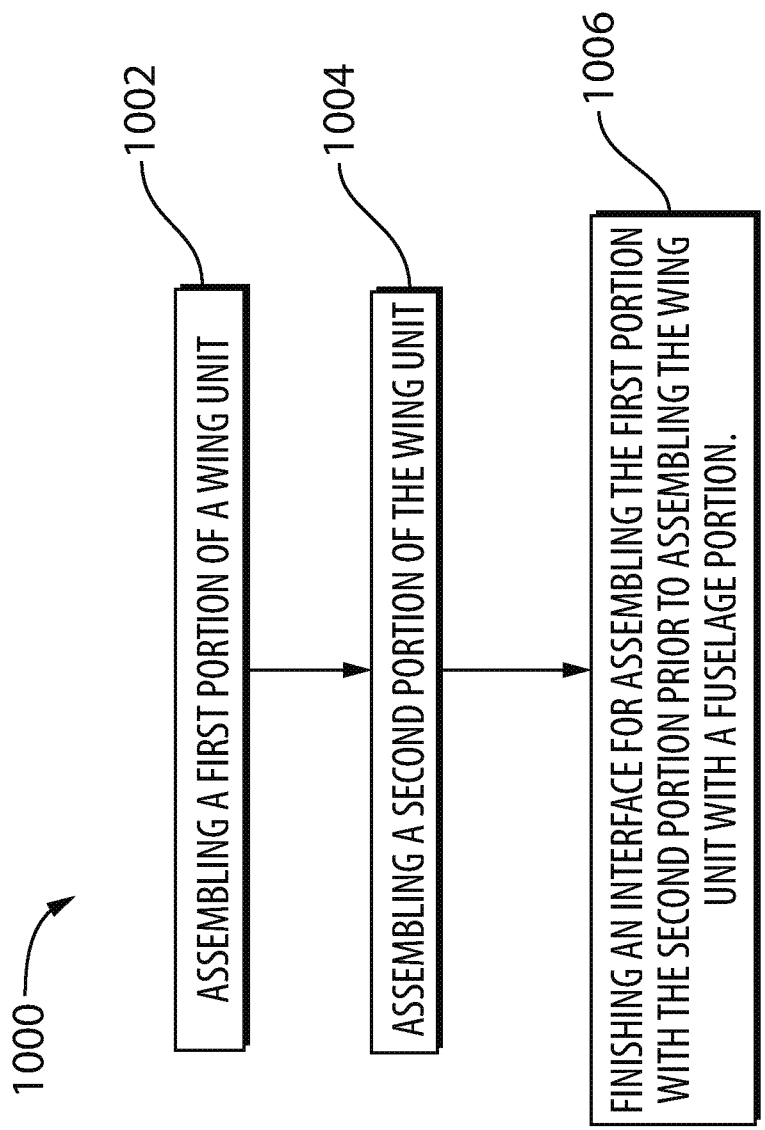

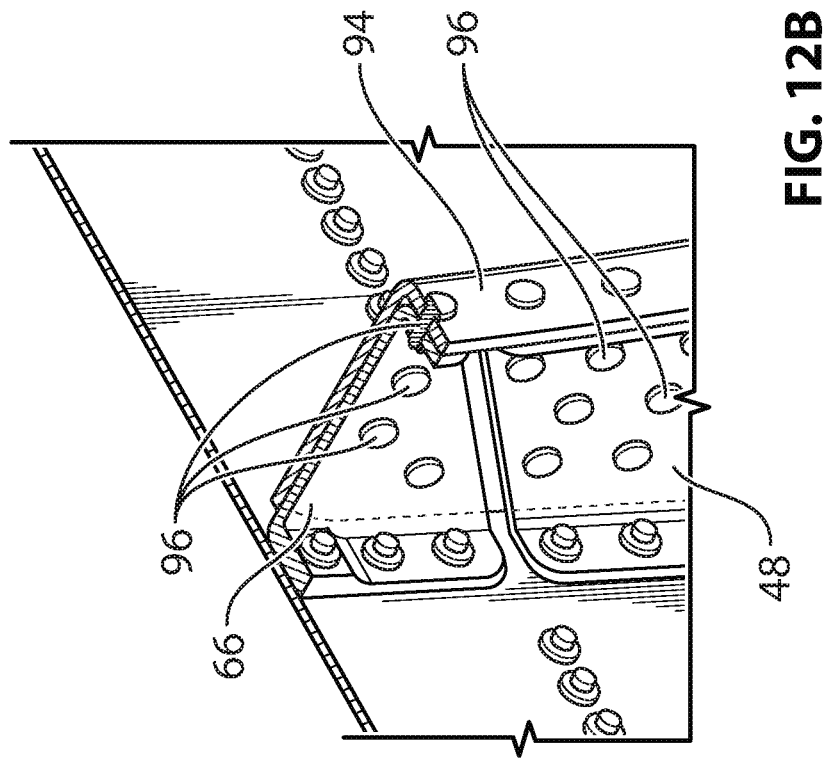

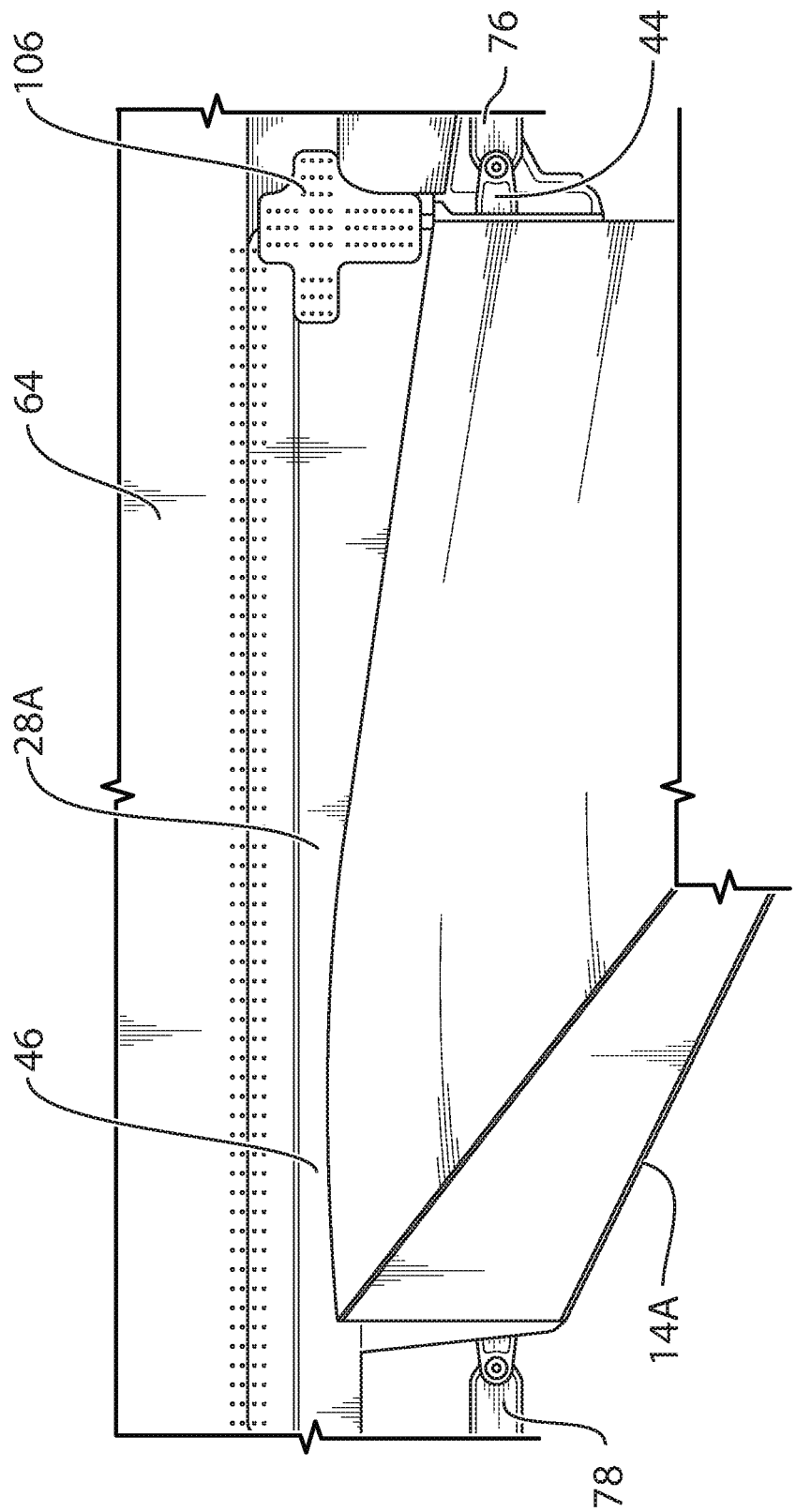

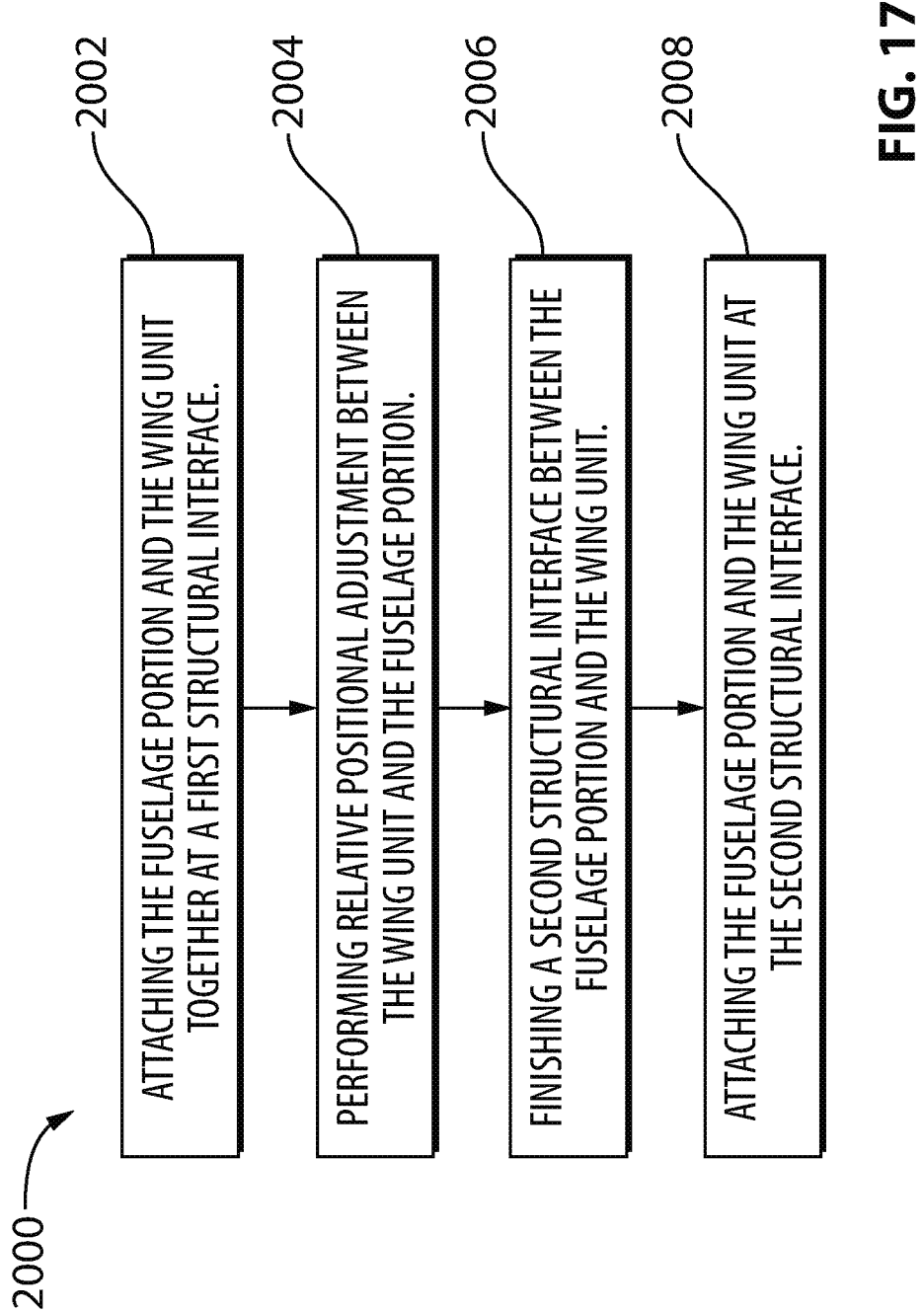

AIRCRAFT WING UNIT WITH PRESSURE FENCE

CROSS-REFERENCE TO RELATED APPLICATION(S)

This application is a national phase application under 35 U.S.C. 371 of International PCT Patent Application No. PCT/IB2018/052906 filed on Apr. 26, 2018, which relies for priority on U.S. Provisional Patent Application Ser. No. 62/492,583 filed on May 1, 2017, the entire content of which is incorporated herein by reference.

TECHNICAL FIELD

The disclosure relates generally to aircraft, and more particularly to the assembly of aircraft.

BACKGROUND

Fixed wing aircraft typically comprise two wings that are attached to a fuselage via a central wing box which defines a load path between the wings and the fuselage. The number of parts needed for assembling the wings to the fuselage via the wing box can be relatively high and the associated assembly operations, which take place on the final assembly line, can be time consuming. Some of the operations associated with assembling the wings to the fuselage can require assembly personnel to have to physically access the space inside the wings in order to perform some of the assembly operations from inside the wings. For some aircraft, the space inside of the wings is relatively small and this can limit the number of individuals that can work on assembling the wings to the fuselage at the same time and this can influence the total assembly time.

SUMMARY

In one aspect, the disclosure describes an aircraft wing unit for assembly with a fuselage portion of an aircraft. The wing unit comprises:
a first wing configured to extend in a first lateral direction relative to the fuselage portion and a second wing configured to extend in an opposite second lateral direction relative to the fuselage portion, the first wing and the second wing being attached together;
a first pressure fence attached to the first wing; and
a second pressure fence attached to the second wing;
wherein:
the first wing, the first pressure fence, the second wing and the second pressure fence together define the wing unit for assembly with the fuselage portion;
the first pressure fence is configured to interface with the fuselage portion and define a first part of a pressure vessel partially defined by the fuselage portion when the wing unit is assembled with the fuselage portion; and
the second pressure fence is configured to interface with the fuselage portion and define a second part of the pressure vessel partially defined by the fuselage portion when the wing unit is assembled with the fuselage portion.
The first pressure fence and the second pressure fence may cooperatively define a cradle for receiving part of the fuselage portion.
The first pressure fence may comprise a first fence skin and the second pressure fence may comprise a second fence skin. The first fence skin may extend upwardly relative to an upper skin of the first wing and also in the first lateral direction. The second fence skin may extend upwardly relative to an upper skin of the second wing and also in the second lateral direction.
An upper portion of the first fence skin and an upper portion of the second fence skin may each be configured to interface with one or more structural members of the fuselage portion.
The first pressure fence may comprise one or more first fence frames and the second pressure fence may comprise one or more second fence frames. The one or more first fence frames and the one or more second fence frames may be configured to be attached to respective fuselage frames.
Embodiments may include combinations of the above features.
In another aspect, the disclosure describes an aircraft structural assembly comprising:
a fuselage portion partially defining a pressure vessel containing a passenger cabin including a cabin floor; and
a wing unit attached to the fuselage portion, the wing unit comprising:
a first wing extending in a first lateral direction relative to the fuselage portion and a second wing extending in an opposite second lateral direction relative to the fuselage portion;
a first pressure fence attached to the first wing, the first pressure fence defining a first part of the pressure vessel partially defined by the fuselage portion, the first pressure fence being attached to the fuselage portion at a first joining location that is disposed vertically above the cabin floor; and
a second pressure fence attached to the second wing, the second pressure fence defining a second part of the pressure vessel partially defined by the fuselage portion, the second pressure fence being attached to the fuselage portion at a second joining location that is disposed vertically above the cabin floor.
The first pressure fence and the second pressure fence may cooperatively define a cradle into which part of the fuselage portion is received.
The first pressure fence may comprise a first fence skin and the second pressure fence may comprise a second fence skin. The first fence skin may extend upwardly relative to an upper wing skin of the first wing and also in the first lateral direction. The second fence skin may extend upwardly relative to the upper wing skin of the second wing and also in the second lateral direction.
An upper portion of the first fence skin may be attached to a first stringer of the fuselage portion and an upper portion of the second fence skin may be attached to a second stringer of the fuselage portion. The first and second stringers may be disposed vertically above the cabin floor of the fuselage portion.
The first pressure fence may comprise one or more first fence frames and the second pressure fence may comprise one or more second fence frames. The one or more first fence frames and the one or more second fence frames may be attached to respective fuselage frames. The one or more first fence frames and the one or more second fence frames may extend vertically above the cabin floor of the fuselage portion.
A portion of the upper wing skin defined by the first wing and the second wing may define a third part of the pressure vessel partially defined by the fuselage portion.

The first pressure fence may comprise a first fence skin and the second pressure fence may comprise a second fence skin. The first pressure fence may comprise one or more first fence frames supporting the first fence skin. The second pressure fence may comprise one or more second fence frames supporting the first fence skin. The one or more first fence frames and the one or more second fence frames may be attached to respective fuselage frames.

The first pressure fence may comprise a first fence skin and the second pressure fence may comprise a second fence skin. The first fence skin and second fence skin may respectively overlap one or more fuselage frames.

An upper skin portion of the wing unit may define a third part of the pressure vessel partially defined by the fuselage portion.

Embodiments may include combinations of the above features.

In another aspect, the disclosure describes a method for producing an aircraft structural assembly using a fuselage portion partially defining a pressure vessel and an assembled wing unit where the wing unit comprises: a first wing extending in a first lateral direction relative to the fuselage portion and a second wing extending in an opposite second lateral direction relative to the fuselage portion; a first pressure fence attached to the first wing; and a second pressure fence attached to the second wing. The method comprises:

assembling the wing unit with the fuselage portion so that the first pressure fence defines a first part of the pressure vessel partially defined by the fuselage portion and the second pressure fence defines a second part of the pressure vessel partially defined by the fuselage portion.

The method may comprise receiving part of the fuselage portion into a cradle cooperatively defined by the first pressure fence and the second pressure fence of the wing unit.

The method may comprise:
attaching the first pressure fence to the fuselage portion at a first joining location that is disposed vertically above a cabin floor of the fuselage portion; and
attaching the second pressure fence to the fuselage portion at a second joining location that is disposed vertically above the cabin floor of the fuselage portion.

The method may comprise:
attaching a first fence skin of the first pressure fence to a first stringer of the fuselage portion, the first stringer being disposed vertically above a cabin floor of the fuselage portion; and
attaching a second fence skin of the second pressure fence to a second stringer of the fuselage portion, the second stringer being disposed vertically above the cabin floor of the fuselage portion.

The method may comprise:
attaching a first fence frame of the first pressure fence to a first fuselage frame of the fuselage portion at a first joining location disposed vertically above the cabin floor of the fuselage portion; and
attaching a second fence frame of the second pressure fence to a second fuselage frame of the fuselage portion at a second joining location disposed vertically above the cabin floor of the fuselage portion.

The method may comprise:
receiving a first portion of the wing unit comprising the first wing and the first pressure fence;
receiving a second portion of the wing unit comprising the second wing and the second pressure fence; and attaching the first and second portions of the wing unit together before assembling the aircraft wing unit with the fuselage portion.

Embodiments may include combinations of the above features.

In another aspect, the disclosure describes a method for producing an aircraft wing unit for assembly with a fuselage portion of an aircraft. The method comprises:

assembling a first portion of the wing unit including: a first wing configured to extend in a first lateral direction relative to the fuselage portion of the aircraft; and a first pressure fence configured to define a first part of a pressure vessel partially defined by the fuselage portion;

assembling a second portion of the wing unit including: a second wing configured to extend in a second lateral direction relative to the fuselage portion of the aircraft; and a second pressure fence configured to define a second part of the pressure vessel partially defined by the fuselage portion; and finishing an interface for assembling the first portion of the wing unit with the second portion of the wing unit prior to assembling the wing unit with the fuselage portion of the aircraft.

The method may comprise:
finishing the interface at a first facility; and then
shipping the first portion of the aircraft wing unit and the second portion of the aircraft wing unit to a second facility prior to assembling the first and second portions of the wing unit together.

The method may comprise:
positioning the first wing and the second wing in their respective in-use configurations relative to each other; and
while the first wing and the second wing are in their respective in-use configurations relative to each other, finishing the interface for assembling the first portion of the aircraft wing unit with the second portion of the aircraft wing unit.

The method may comprise:
positioning the first wing and the second wing in their respective in-use configurations relative to each other; and
while the first wing and the second wing are in their respective in-use configurations relative to each other, assembling the first pressure fence to the first portion of the aircraft wing unit and assembling the second pressure fence to the second portion of the aircraft wing unit.

The method may comprise, while the first wing and the second wing are in their respective in-use configurations relative to each other, finishing the interface for assembling the first portion of the aircraft wing assembly with the second portion of the aircraft wing assembly.

The method may comprise:
assembling the first portion of the wing unit with the second portion of the wing unit; and then
assembling the wing unit with the fuselage portion of the aircraft.

Embodiments may include combinations of the above features.

In a further aspect, the disclosure describes an aircraft comprising an assembly as disclosed herein.

In a further aspect, the disclosure describes an aircraft comprising a wing unit as disclosed herein.

Further details of these and other aspects of the subject matter of this application will be apparent from the detailed description included below and the drawings.

DESCRIPTION OF THE DRAWINGS

Reference is now made to the accompanying drawings, in which:

FIG. 5A is a partial perspective view of the wing unit showing an interior of the wing unit;

FIG. 5B is an enlarged perspective cross-sectional view of an exemplary seam in an upper wing skin of the wing unit;

FIG. 5C is an enlarged perspective cross-sectional view of an exemplary seam in a lower wing skin of the wing unit;

FIG. 6 is a flowchart illustrating an exemplary method for producing the wing unit;

FIG. 12B is a perspective cross-sectional view taken along line 12-12 of FIG. 12A;

FIG. 16 is a perspective view of an exterior of the pressure fence when the wing unit and the fuselage portion are assembled together; and FIG. 17 is a flowchart illustrating an exemplary method for assembling the wing unit with the fuselage portion.

DETAILED DESCRIPTION

In various embodiments, the present disclosure discloses assemblies and methods that facilitate the assembly of aircraft. For example, aircraft wing assemblies that can be assembled as a unit (i.e., single-piece wing) with a fuselage portion of an aircraft, and associated methods are disclosed. In some embodiments, such a wing unit can include features that are configured to define one of more parts of a pressure vessel that is partially defined by the fuselage portion. In some embodiments, the aircraft assemblies disclosed herein comprise one or more first structural interfaces that permit positional (e.g., aerodynamic) adjustment between the wing unit and the fuselage portion so that one or more second structural interfaces may be finished only after such positional adjustment and while the wing unit is attached to the fuselage portion via the first structural interface. In some embodiments, the aircraft assemblies disclosed herein comprise one or more structural interfaces that are disposed outside of the wing unit in order to eliminate or reduce the need for assembly personnel to access the interior of the wing unit to carry out the structural assembly of the wing unit to the fuselage portion. This may facilitate the assembly process and also permit several individuals to work on the assembly process simultaneously in order to reduce the overall assembly time.

Aspects of various embodiments are described through reference to the drawings.

Figure 1:
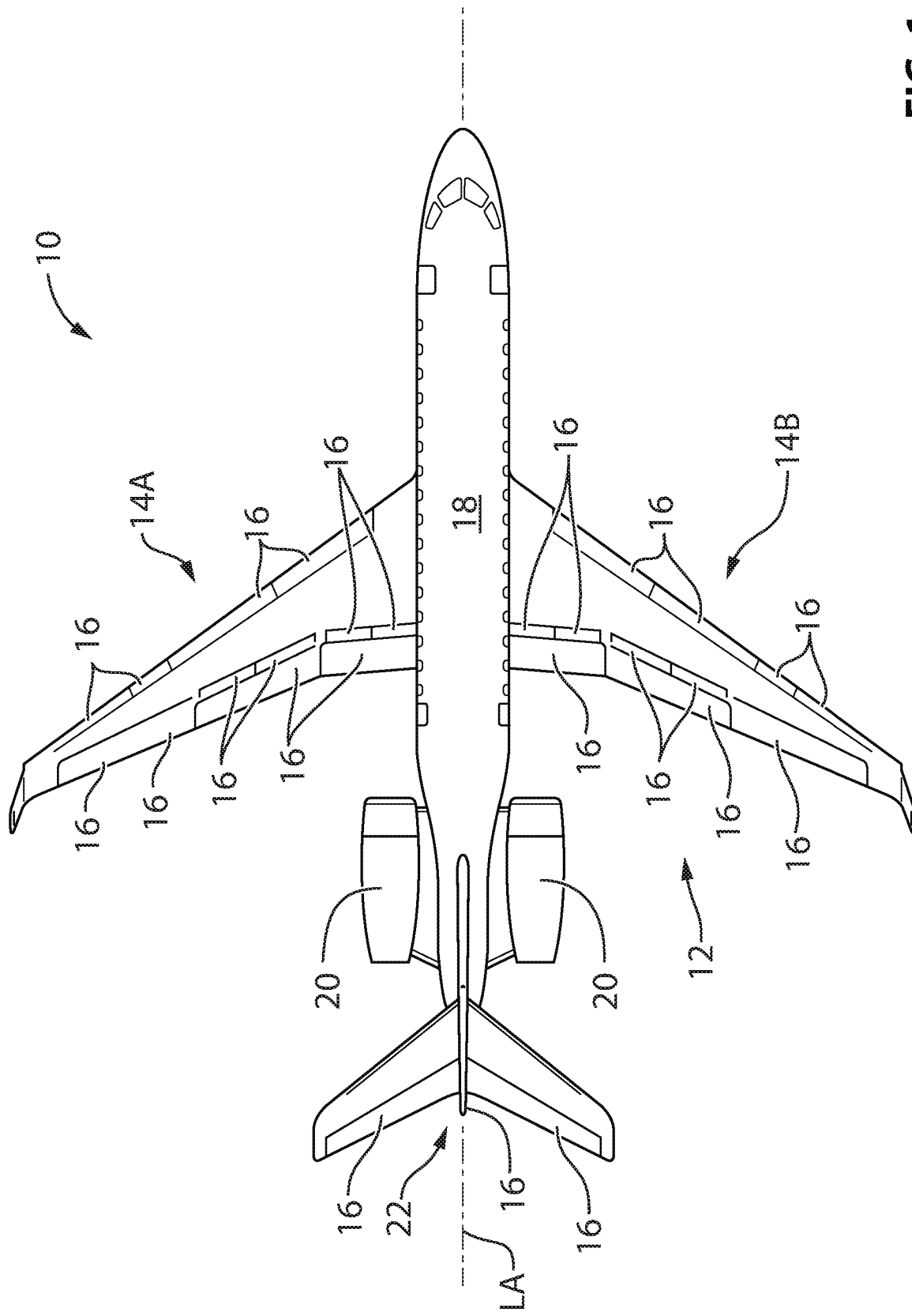
FIG. 1 is a top plan view of an exemplary aircraft comprising a wing unit as described herein.

FIG. 1 is a top plan view of an exemplary aircraft 10 which may comprise wing unit 12 and which may be assembled using one or more methods disclosed herein. Aircraft 10 may, for example, be any type of aircraft such as corporate (e.g., business jet), private, commercial and passenger aircraft suitable for civil aviation. For example, aircraft 10 may be a long-range business jet having relatively thin wings 14A, 14B (referred generally as "wings 14") and hence with relatively little space inside wings 14 for access by assembly personnel. Aircraft 10 may be a fixed-wing aircraft.

Aircraft 10 may comprise flight control surfaces 16 (e.g., flaps, slats, ailerons, spoilers, elevator(s), rudder(s)), fuselage 18, one or more engines 20 and empennage 22. One or more of flight control surfaces 16 may be mounted to wings 14. One or more of engines 20 may be mounted to fuselage 18. Alternatively, or in addition, one or more of engines 20 may be mounted to wings 14. Aircraft 10 may have a longitudinal axis LA extending through fuselage 18 from tail to nose in the normal direction of flight, or the direction the pilot faces. Longitudinal axis LA may correspond to a roll axis of aircraft 10.

Figure 2:
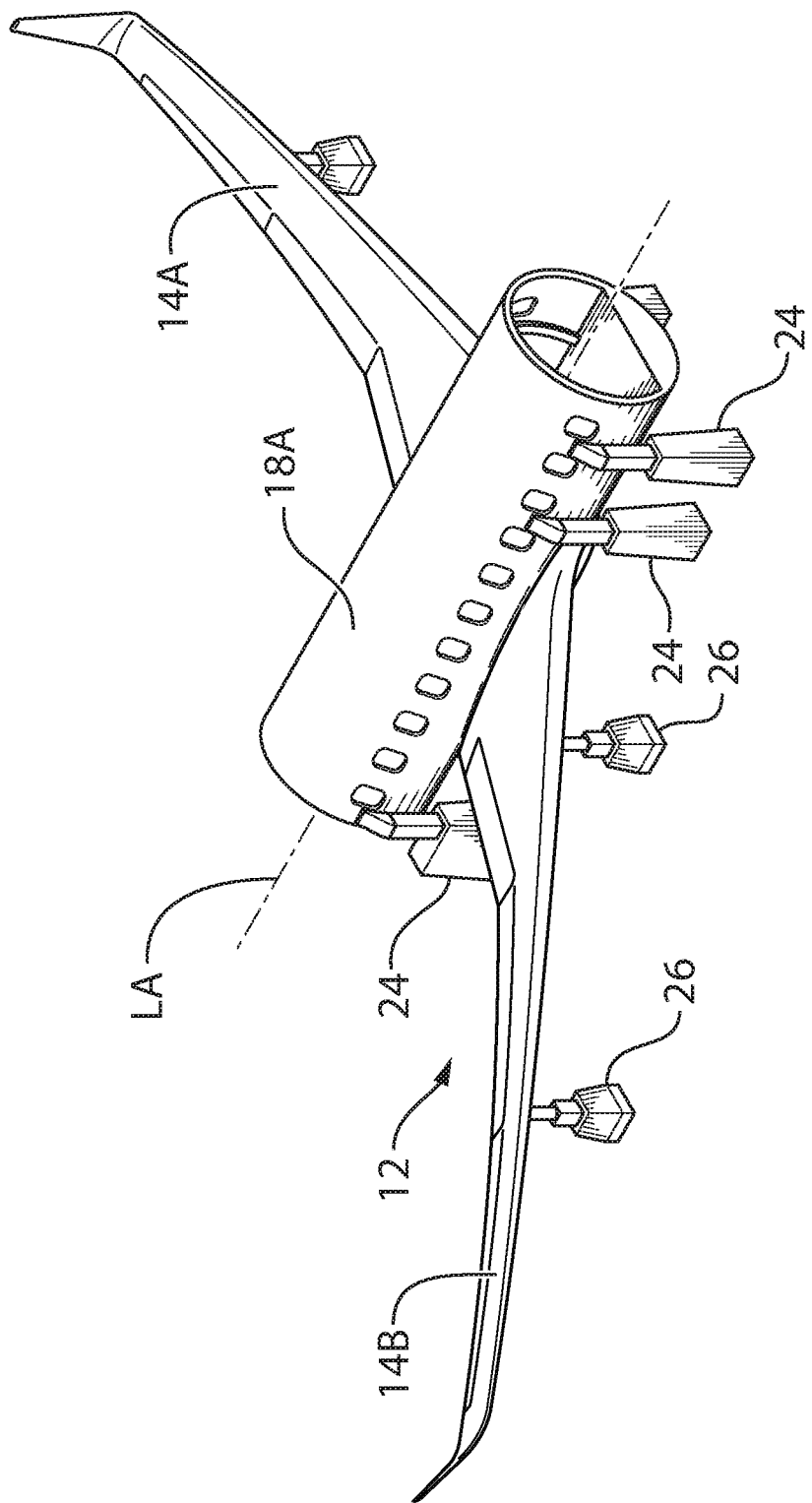
FIG. 2 is a perspective view of the wing unit and a fuselage portion of the aircraft of FIG. 1 in the process of being assembled together.

FIG. 2 is a perspective view of wing unit 12 and fuselage portion 18A of aircraft 10 in the process of being assembled together. Fuselage portion 18A may be a mid-fuselage portion of aircraft 10 and may define part of a pressure vessel comprising a passenger cabin of aircraft 10. During assembly, fuselage portion 18A may be supported by fuselage supports 24 and wing unit 12 may be supported by wing supports 26. In some embodiments, wing supports 26 may be controllably actuated so that wing unit 12 may be moved (e.g., raised) relative to fuselage portion 18A in order to bring wing unit 12 and fuselage portion 18A together for assembly. Alternatively or in addition, fuselage supports 24 may be controllably actuated so that fuselage portion 18A may be moved (e.g., lowered) relative to wing unit 12 in order to bring wing unit 12 and fuselage portion 18A together for assembly.

Figure 3:
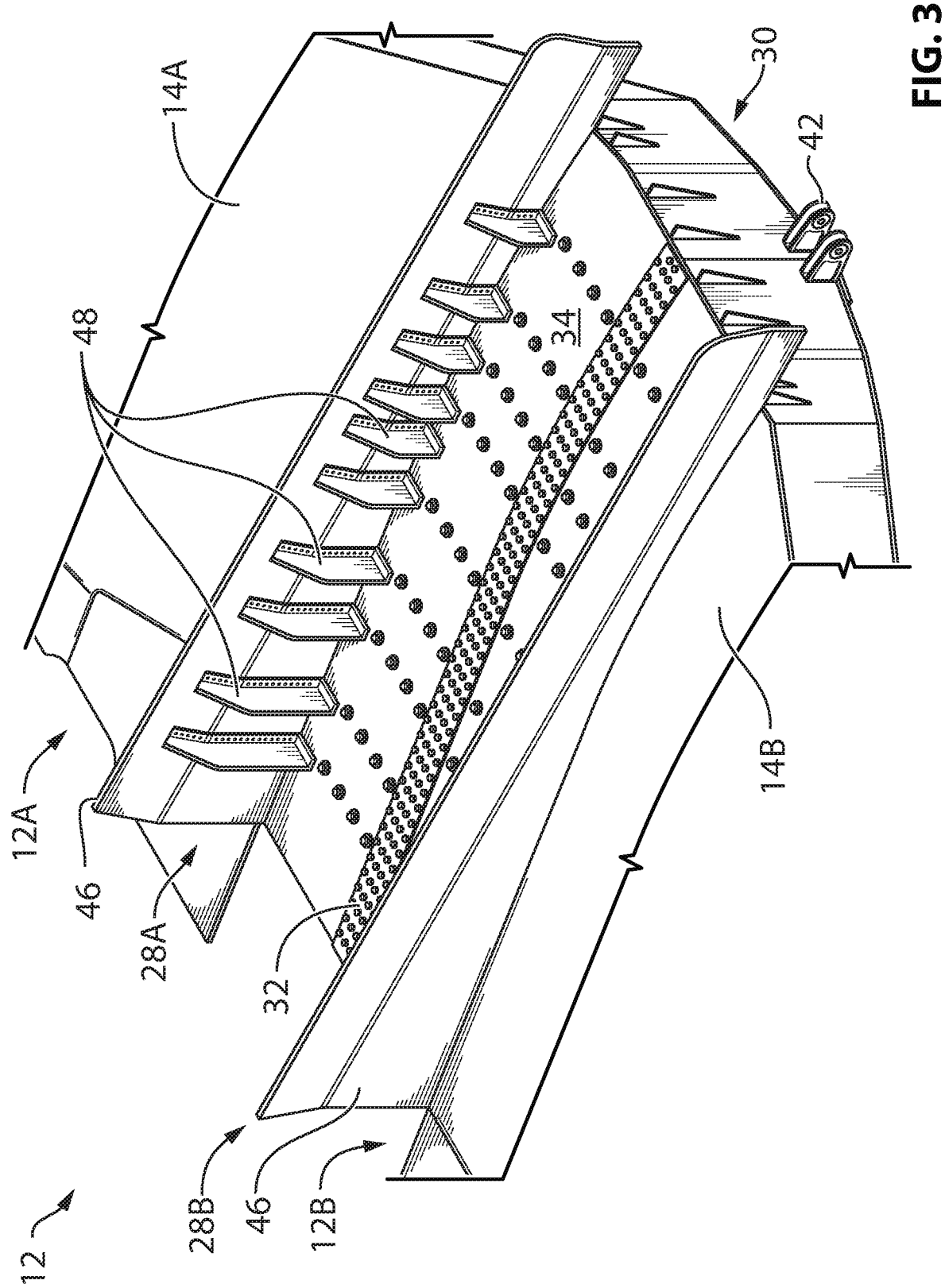
FIG. 3 is a partial perspective view of the wing unit prior to assembly with the fuselage portion.

FIG. 3 is a partial perspective view of wing unit 12 prior to assembly with fuselage portion 18A. Wing unit 12 may comprise an assembly of parts that can be assembled separately from fuselage unit 18A and subsequently be assembled as a pre-assembled unit with fuselage portion 18A in order to facilitate assembly of aircraft 10. For the sake of clarity, some details of wing unit 12 including flight control surfaces 16 have been omitted from some figures herein. It is understood that in some embodiments, wing unit 12 may additionally comprise one or more flight control surfaces 16 that may be coupled to or form part of wings 14 before the attachment of wing unit 12 to fuselage portion 18A. Alternatively, one or more flight control surfaces 16 may be attached to wing unit 12 only after wing unit 12 has been attached to fuselage portion 18A.

Wing unit 12 may comprise wing 14A configured to extend in a first lateral direction (e.g., port side) relative to fuselage portion 18A and wing 14B configured to extend in an opposite second lateral direction (e.g., starboard side) relative to fuselage portion 18A. Wings 14A and 14B may define a wingspan of aircraft 10 as shown in FIG. 1. Wings 14A and 14B may be attached together at an intermediate portion 30 of wing unit 12. Intermediate portion 30 of wing unit 12 may define a wing box for interfacing with fuselage portion 18A but that is part of wing unit 12 for assembly with fuselage portion 18A.

Wing unit 12 may comprise pressure fence 28A attached to wing 14A and pressure fence 28B attached to wing 14B. Pressure fence 28A may be disposed at or near a root of wing 14A. Similarly, pressure fence 28B may be disposed at or near a root of wing 14B. Pressure fences 28A, 28B may be configured to interface with fuselage portion 18A and respectively define parts of the pressure vessel partially defined by fuselage portion 18A when wing unit 12 is assembled with fuselage portion 18A.

Figure 4:
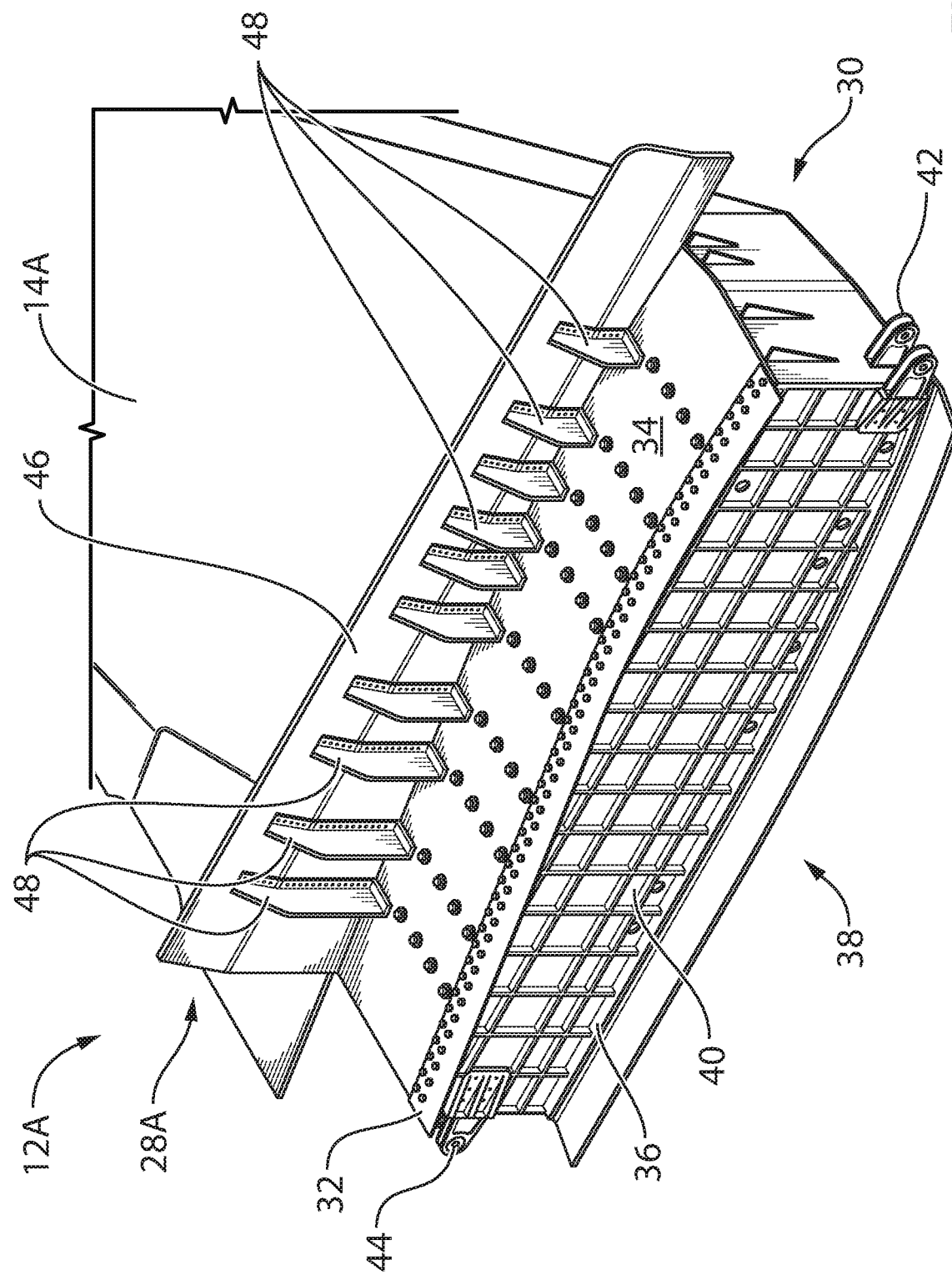
FIG. 4 is a partial perspective view of a first portion of the wing unit.

FIG. 4 is a partial perspective view of first portion 12A of the wing unit 12. In some embodiments, wing unit 12 may be manufactured as two portions (e.g., counterparts or halves) that are subsequently assembled together at upper seam 32 formed in upper wing skin portion 34 defined by wings 14 and at lower seam 36 formed in lower wing skin 38 defined by wings 14. For example, first portion 12A and a substantially similar second portion 12B (shown in FIG. 3) may be fabricated at a first facility (e.g., a supplier's facility) and shipped to an aircraft manufacturer's facility where both portions 12A, 12B may then be assembled together to form wing unit 12, and then, wing unit 12 may subsequently be assembled with fuselage portion 18A. First portion 12A and second portion 12B may not necessarily be identical. For example, some components such as middle rib 40, forward keel beam fitting 42 and aft keel beam fitting 44 may be unique within wing unit 12 and accordingly may be disposed on only one or the other of first portion 12A and second portion 12B of wing unit 12. In some embodiments, upper seam 32 in upper wing skin portion 34 may follow a curvature of upper wing skin portion 34 and may lie in a (e.g., vertical) plane that is substantially parallel to longitudinal axis LA. In some embodiments, upper seam 32 may be disposed at a mid-point along a wingspan of wing unit 12. In some embodiments, upper seam 32, lower seam 36 and longitudinal axis LA may lie in a common vertical plane.

In some embodiments, upper wing skin portion 34 may define part of the pressure vessel partially defined by fuselage portion 18A and may comprise relatively few seams so as to provide relatively few potential leak paths. Upper wing skin portion 34 may extend partially or substantially entirely between a forward portion of wing unit and an aft portion of wing unit 12 (e.g., between a front spar and an aft spar of wing unit 12). In some embodiments, upper wing skin portion 34 partially defining the pressure vessel may comprise only one single upper seam 32, which may be a longitudinal seam. For example, the entirety of upper wing skin portion 34 that partially defines the pressure vessel may be free of any transverse seams relative to longitudinal axis LA.

In some embodiments, pressure fences 28A, 28B may be mirror images of each other and may have substantially identical constructions so the following description of pressure fence 28A also applies to pressure fence 28B. However, it is understood that pressure fences 28A and 28B may not necessarily be identical. Pressure fence 28A may comprise fence skin 46 supported by one or more fence frames 48. Fence skins 46 of each pressure fence 28A, 28B may extend upwardly relative to the upper wing skin of respective wings 14A, 14B. In some embodiments, fence skins 46 may also extend in the respective lateral directions of wings 14A, 14B (i.e., laterally away from longitudinal axis LA, in respective outboard directions) and may define a cradle or "V" shape for receiving part of fuselage portion 18A therein during assembly as explained below.

FIG. 4 also illustrates the curvature of upper wing skin portion 34 defined by wings 14. Upper wing skin portion 34 may have a convex curvature relative to wing unit 12. For example part(s) of upper wing skin portion 34 may have a rounded shape that extends outwardly (i.e., generally upwardly) relative to wing unit 12. For example, in some embodiments, at least some of upper wing skin portion 34 may be non-parallel to longitudinal axis LA of fuselage portion 18A.

In embodiments where upper wing skin portion 34 defines part (e.g., a pressure floor) of the pressure vessel defined by fuselage portion 18A, the convex curvature of upper wing skin portion 34 may provide structural advantages including increased stiffness relative to a flat floor of otherwise comparable construction. Accordingly, the (e.g., convex) curvature of upper wing skin portion 34 may result in less structural reinforcement being required compared to a flat floor and hence may result in reduced weight in some embodiments. Also, the use of upper wing skin portion 34 as the pressure floor may, in some embodiments, eliminate the need for fuselage portion 18A to have a separate pressure floor disposed above wing skin portion 34.

FIG. 5A is a partial perspective view of wing unit 12 where part of a forward spar of wing unit 12 has been omitted to show the interior of part of wing unit 12. Wing unit 12 may comprise root rib 50, which may be disposed at or near a root of wing 14A. Wing 14B may have a substantially identical construction as wing 14A and the description of wing 14A herein may also apply to wing 14B. Root rib 50 may be disposed under or near pressure fence 28A so that pressure fence 28A may be attached to root rib 50 and that root rib 50 may provide some structural support for pressure fence 28A. Upper wing skin portion 34 may be supported by root rib 50 and therefore root rib 50 may at least partially define the curvature of upper wing skin portion 34. Similarly, upper wing skin portion 34 may be supported by a root rib (not shown) of wing 14B and therefore such root rib may also at least partially define the curvature of upper wing skin portion 34. In some embodiments, upper wing skin portion 34 may have a construction that is substantially symmetric relative to longitudinal axis LA. In some embodiments, upper wing skin portion 34 may have a construction that is substantially symmetric relative to a plane in which upper seam 32 and middle rib 40 lie.

Upper wing skin portion 34 may also be supported by middle rib 40 of wing unit 12 and therefore middle rib 40 may at least partially define the curvature of upper wing skin portion 34. In some embodiments, an upper portion of root rib 50 and an upper portion of middle rib 40 may define different curvatures so that upper wing skin portion 34 may have a varying curvature across its span. Alternatively, the upper portion of root rib 50 and the upper portion of middle rib 40 may have parts thereof that are of substantially identical curvatures so that upper wing skin portion 34 may have a constant curvature across its span between middle rib 40 and root rib 50. Even though upper wing skin portion 34 may not be exposed to airflow during flight, it may nevertheless have the same aerodynamic profile as wing 14A (e.g., and as wing 14B) at the root of wing 14A as defined by root rib 50.

FIG. 5B is an enlarged perspective cross-sectional view of upper seam 32 in upper wing skin portion 34 of wing unit 12. FIG. 5C is an enlarged perspective cross-sectional view of lower seam 36 in lower wing skin 38 of wing unit 12. Upper seam 32 and lower seam 36 may define a structural interface between first and second portions 12A, 12B of wing unit 12 and may permit portions 12A, 12B to be manufactured as subunits and subsequently assembled together to form wing unit 12.

In reference to FIG. 5B, upper seam 32 may comprise a splice joint between two panels of upper wing skin portion 34 where upper external strap 52 may overlap both panels of upper wing skin portion 34 and may be secured to both panels by way of suitable fasteners 54 extending through upper external strap 52, through upper wing skin portion 34 and through flanges of middle rib 40. In other words, upper external strap 52 may serve as a splice joining adjacent panels of upper wing skin portion 34 together and to middle rib 40. In some embodiments, where upper wing skin portion 34 also serves as a pressure floor, upper seam 32 may be suitably sealed to withstand the pressurization load of the passenger cabin of fuselage portion 18A. For example, one or more surfaces within upper seam 32 may comprise suitable fay surface sealant to achieve suitable sealing.

In reference to FIG. 5C, lower seam 36 may comprise a splice joint between two panels of lower wing skin 38 where lower external strap 56 and lower internal strap 58 may overlap both panels of lower wing skin 38 and may be secured to both panels by way of suitable fasteners 54 extending through lower external strap 56, through lower internal strap 58, through lower wing skin 38 and through flanges of middle rib 40. In other words, lower external strap 56 and lower internal strap 58 may serve as splices joining adjacent panels of lower wing skin 38 together and to middle rib 40.

Wing unit 12 may be constructed using conventional or other fasteners and other materials suitable for aircraft structures. For example, in various embodiments, wing unit 12 may comprise suitable metallic and/or composite materials. In some embodiments, upper wing skin portion 34, upper external strap 52 and/or other components of wing unit 12 may comprise a suitable aluminum-lithium alloy for example. In some embodiments, upper wing skin portion 34, upper external strap 52 and/or other components of wing unit 12 may comprise a suitable carbon fiber reinforced polymer for example.

FIG. 6 is a flowchart illustrating a method 1000 for producing wing unit 12 for assembly with fuselage portion 18A of aircraft 10. In various embodiments, method 1000 may comprise assembling first portion 12A of wing unit 12 (see block 1002), assembling second portion 12B of wing unit 12 (see block 1004), and then finishing an interface (e.g., seams 32 and 36) for assembling first portion 12A with second portion 12B prior to assembling wing unit 12 with fuselage portion 18A of aircraft 10 (see block 1006). As explained above, first portion 12A may comprise wing 14A configured to extend in the first lateral direction relative to fuselage portion 18A, and pressure fence 28A configured to define a first part of the pressure vessel partially defined by fuselage portion 18A. Similarly, second portion 12B may comprise wing 14B configured to extend in the second lateral direction relative to fuselage portion 18A, and pressure fence 28B configured to define a second part of the pressure vessel partially defined by fuselage portion 18A.

Method 1000 and the configuration of wing unit 12 may permit first and second portions 12A, 12B to be manufactured at a first facility (e.g., supplier) and then shipped as separate sub-units to a second facility (e.g., aircraft manufacturer). The two portions 12A, 12B of wing unit 12 may then be assembled at the second facility to form wing unit 12. In some embodiments, the interface (e.g., seams 32 and 36) may be at least partially finished at the first facility prior to shipping so that first and second portions 12A, 12B may be readily assembled together upon arrival at the second facility. The finishing of the interface may comprise drilling, reaming and/or deburring holes in upper wing skin portion 34, upper external strap 52, middle rib 40, lower wing skin 38, lower external strap 56 and lower internal strap 58 for fasteners 54 to be installed at seams 32, 36 while wings 14 of first and second portions 12A, 12B are positioned in their respective in-use configurations (e.g., with proper dihedral angle, pitch, roll) relative to each other. Accordingly, the advanced preparation (e.g., pre-drilling of holes) of the interface at the first facility may facilitate the assembly of first and second portions 12A, 12B at their proper positions (including orientations) relative to each other at the second facility. Finishing of the interface is intended to encompass tasks associated with making the interface ready for attachment and may include pre-forming corresponding holes in both portions 12A, 12B of wing unit 12 so that subsequent assembly of the two portions 12A, 12B will result in the two portions 12A, 12B being correctly positioned relative to each other. In other words, finishing the interface comprises incorporating in-use relative positional constraints of the two portions 12A, 12B of wing unit 12 into the interface.

Similarly, pressure fences 28A and 28B may be pre-assembled with their respective wings 14A, 14B of wing unit 12 at the first facility to be in their respective in-use positions (including orientations) relative to wing unit 12. This may be achieved in any suitable way. In some embodiments, method 1000 may include positioning wings 14 in their respective in-use configurations relative to each other and then assembling pressure fence 28A with wing 14A and assembling pressure fence 28B with wing 14B so that pressure fences 28A and 28B may be ready to interface with fuselage portion 18A when wing unit 12 is assembled with fuselage portion 18A.

Figure 7A:
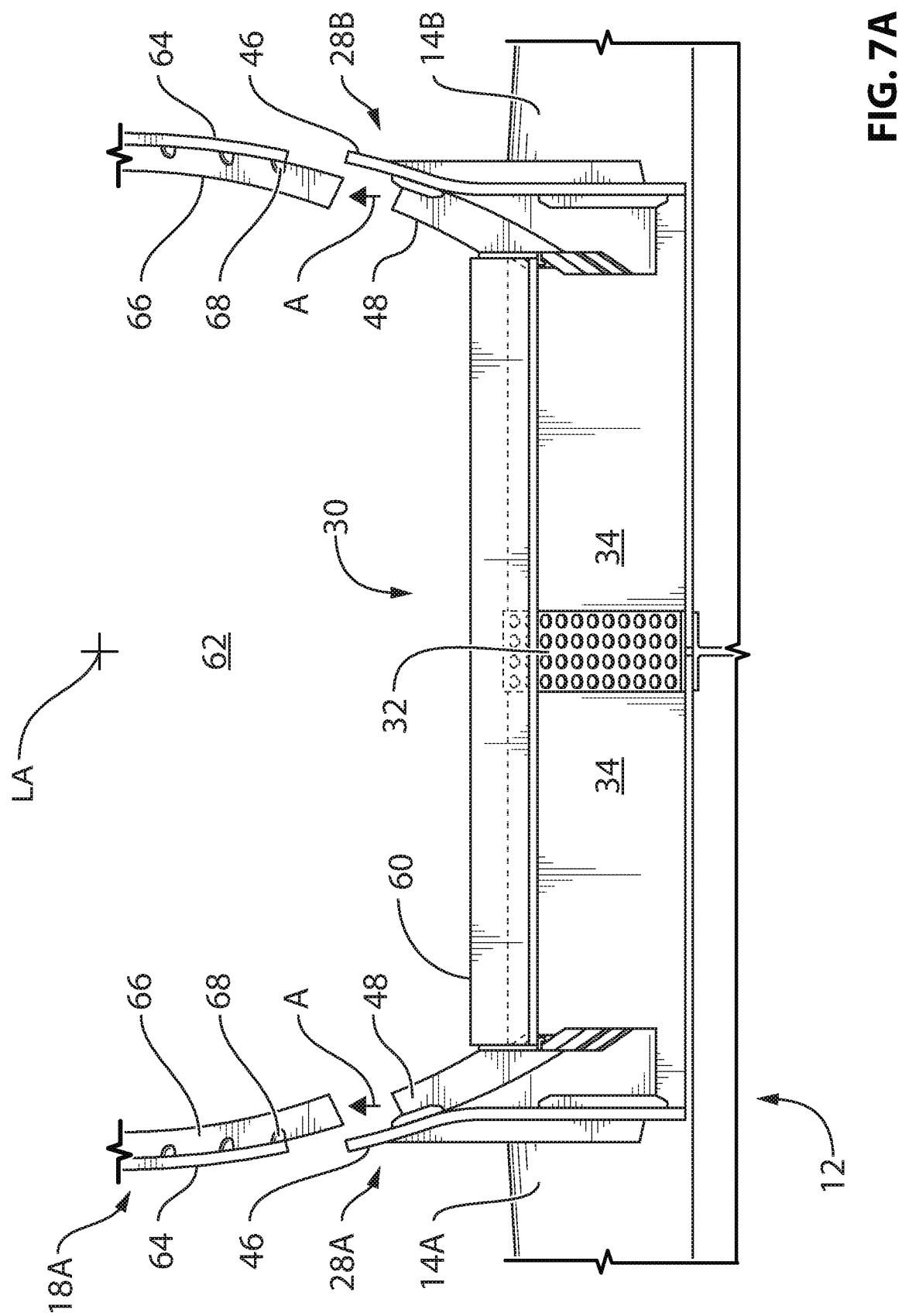
FIGS. 7A and 7B graphically illustrate an exemplary method for producing an aircraft structural assembly using the fuselage portion and the wing unit.
Figure 7B:
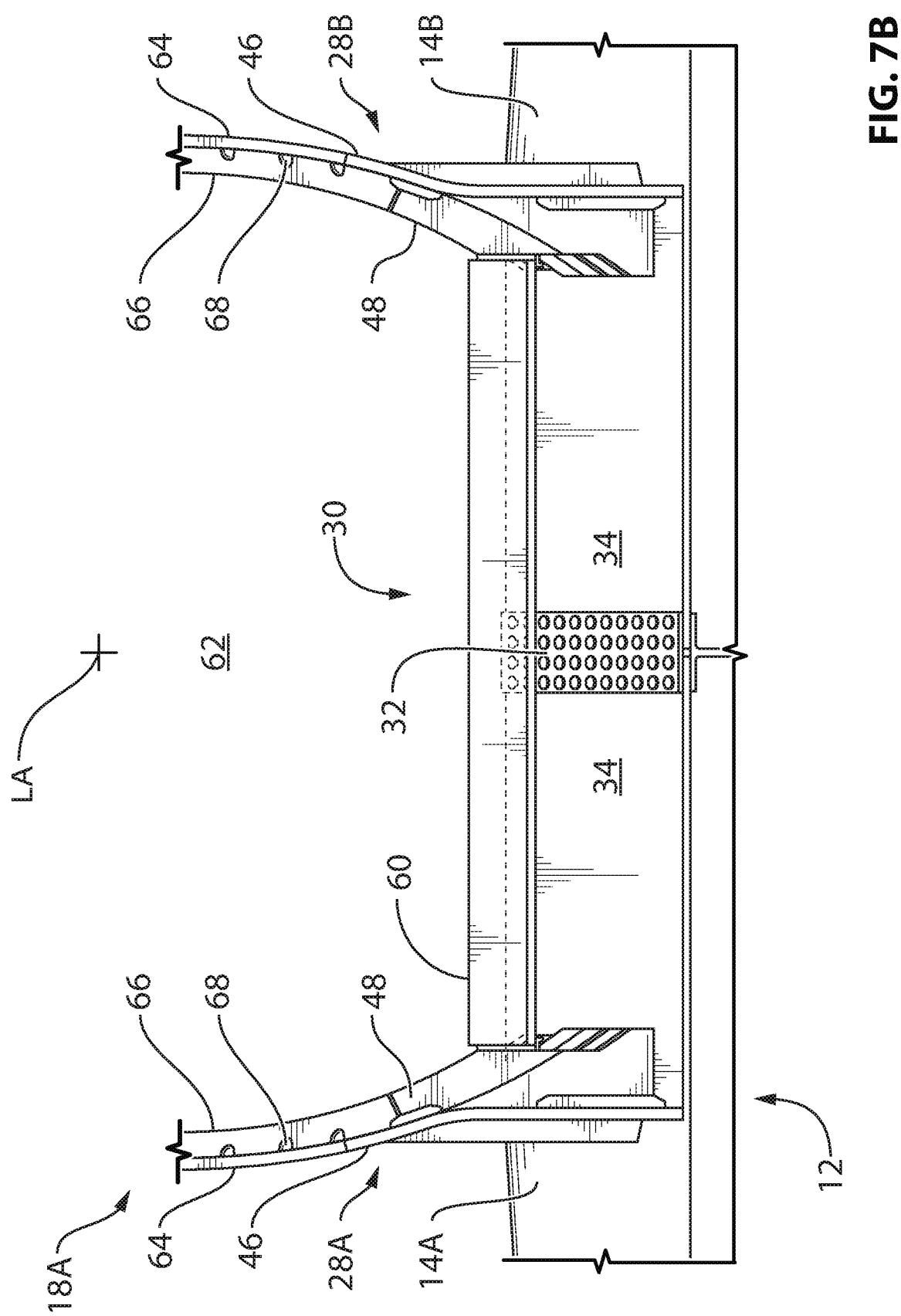

FIGS. 7A and 7B graphically illustrate a method for producing an aircraft structural assembly using fuselage portion 18A partially defining a pressure vessel and pre-assembled wing unit 12 as described herein. FIGS. 7A and 7B show parts of fuselage portion 18A and of wing unit 12 when viewed along longitudinal axis LA from an aft position relative to wing unit 12 and toward a forward direction relative to aircraft 10. In various embodiments, the method may comprise assembling wing unit 12 with fuselage portion 18A so that pressure fence 28A defines a first part of the pressure vessel partially defined by fuselage portion 18A and second pressure fence 28B defines a second part of the pressure vessel partially defined by fuselage portion 18A. Respective upper portions of pressure fences 28A, 28B may be configured to interface with one or more structural members of fuselage portion 18A.

Fuselage portion 18A may comprise cabin floor 60, which is only partially shown in FIGS. 7A and 7B. Cabin floor 60 may partially define passenger cabin 62 disposed within the pressure vessel cooperatively defined by fuselage portion 18A and wing unit 12. For example, the pressure vessel may be partially defined by fuselage skin 64, fence skins 46, upper wing skin portion 34 and other components. FIG. 7A shows wing unit 12 being brought toward fuselage portion 18A along arrows A and FIG. 7B shows wing unit 12 being in its final (i.e., in-use) assembled position relative to fuselage portion 18A. Fuselage portion 18A may comprise fuselage frames 66 supporting and generally defining the shape of fuselage skin 64. Fuselage portion 18A may also comprise stringers 68, sometimes called longerons, attached to fuselage frames 66 and extending generally along longitudinal axis LA. Stringers 68 may also support fuselage skin 64.

The use of pressure fences 28A, 28B as disclosed herein may facilitate the assembly of wing unit 12 to fuselage portion 18A. For example, joining interfaces between wing unit 12 and fuselage portion 18A may include joints between fence frames 48 and respective fuselage frames 66 and also joints between fence skins 46 and respective stringers 68 as explained below. Such joining interfaces may be disposed vertically above cabin floor 60 and facilitate access to such joining interfaces by assembly personnel. For example, an upper portion of each fence skin 46 may be attached to a respective corresponding stringer 68 of fuselage portion 18A.

The shape and configuration of pressure fences 28A, 28B may further facilitate assembly whereby pressure fences 28A and 28B may cooperatively define a cradle or receptacle comprising a "V" shape into which part of fuselage portion 18A such as fuselage frames 66 may be received when wing unit 12 is raised toward fuselage portion 18A and approaches its final assembled position relative to fuselage portion 18A. For example, each fence skin 46 may extend upwardly relative to upper wing skin portion 34 and also in a respective lateral direction (i.e., away from each other). The shape cooperatively defined by pressure fences 28A and 28B may, in some embodiments, facilitate assembly by providing some self-alignment function as wing unit 12 and fuselage portion 18A are brought together. Fence skins 46 may each overlap one or more fuselage frames 66. In some embodiments, fence skins 46 may be attached to fuselage frames 66.

Figure 8:
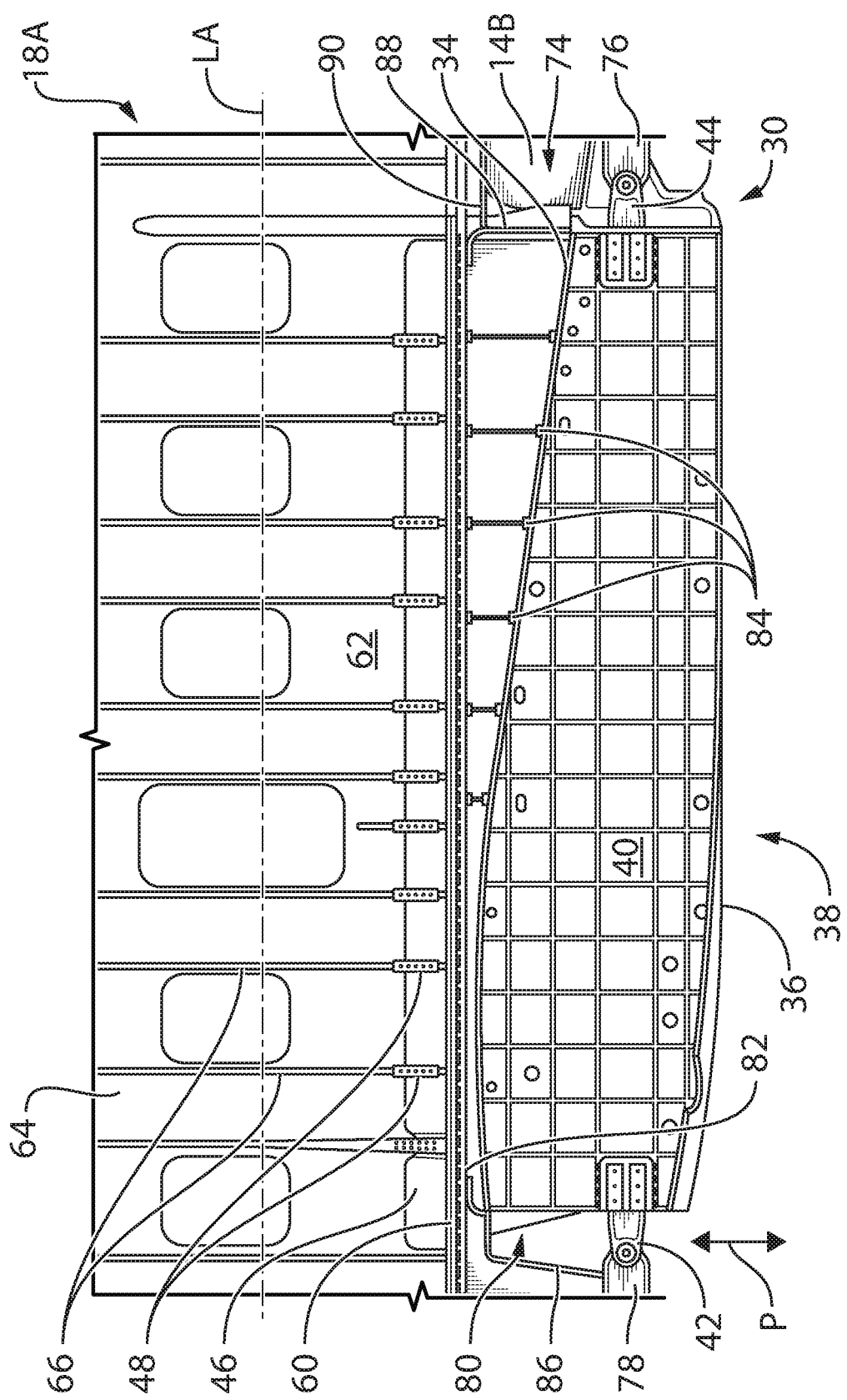
FIG. 8 is an axial cross-sectional view through the fuselage portion and the wing unit.

FIG. 8 is an axial cross-sectional view through fuselage portion 18A and wing unit 12 showing fuselage portion 18A and wing unit 12 in their respective assembled in-use positions. The assembly of wing unit 12 with fuselage portion 18A may be achieved by bringing wing unit 12 and fuselage portion 18A together using fuselage supports 24 and/or wing supports 26 (see FIG. 2) and then attaching wing unit 12 and fuselage portion 18A together at a plurality of joining locations. During an early stage of the assembly process, wing unit 12 and fuselage portion 18A may define a first structural interface intended to provide one or more initial points of attachment and a second structural interface intended to provide one or more subsequent points of attachment between wing unit 12 and fuselage portion 18A. The first structural interface may be configured so that when fuselage portion 18A and wing unit 12 are attached together at the first structural interface but are unattached at the second structural interface, the first structural interface permits relative positional adjustment between wing unit 12 and fuselage portion 18A.

In some embodiments, the second structural interface may initially be unfinished (i.e., does not incorporate final in-use relative positional constraints of wing unit 12 and fuselage portion 18A) so that it may be finished only after such relative positional adjustment between fuselage portion 18A and wing unit 12. The first structural interface may accordingly provide an initial point of attachment between fuselage portion 18A and wing unit 12 and also accommodate some relative positional adjustment between fuselage portion 18A and wing unit 12 in one or more degrees of freedom within respective predetermined tolerances. The relative positional adjustment between fuselage portion 18A and wing unit 12 may be achieved by way of fuselage supports 24 and/or wing supports 26 (see FIG. 2), which may be actuated. The positional adjustment afforded by the first structural interface may permit the second interface to be finished only after the desired positional adjustment has been done and while wing unit 12 and fuselage portion 18A are attached via the first interface and are supported by wing supports 26 and fuselage supports 24 respectively. The finishing of the second interface may, for example, comprise drilling, reaming and/or deburring holes to receive suitable fasteners.

Finishing the second interface in situ while wing unit 12 and fuselage portion 18A are in their final positions relative to each other may facilitate the assembly process. For example, instead of trying to align pre-drilled holes on parts of wing unit 12 with pre-drilled holes on parts of fuselage portion 18A at different joining locations and facing challenges associated with tolerance stack-up, the finishing of the holes in situ facilitates the alignment of the corresponding holes. In some embodiments, one or more first holes in one of wing unit 12 or fuselage portion 18A may be pre-drilled while corresponding one or more second holes in the other of wing unit 12 or fuselage portion 18A may be drilled and/or reamed after positional adjustment while using the first holes as respective guides to ensure suitable alignment of the first holes and second holes. In some embodiments, one or more first holes in wing unit 12 may be absent or otherwise unfinished (e.g., pilot holes only) and one or more corresponding second holes in fuselage portion 18A may also be absent or otherwise unfinished so that the first holes and the second holes may be drilled and/or reamed (e.g., together, simultaneously) after positional adjustment to ensure suitable alignment.

The first structural interface and the second structural interface may each comprise one joint or a plurality of joints at different locations. In some embodiments, the first interface providing the initial point(s) of attachment may, for example, comprise one or more aft tension fittings 74 for attachment with aft pressure wall 88 of fuselage portion 18A. Aft tension fitting(s) 74 may be disposed at or proximal to an aft portion of wing unit 12. For example, aft tension fittings 74 may be attached to or integrated into an aft spar of wing unit 12. In some embodiments, the second interface providing the subsequent point(s) of attachment may, for example, comprise: aft keel beam fitting 44 of wing unit 12 for attachment with aft keel beam 76 of fuselage portion 18A; forward keel beam fitting 42 of wing unit 12 for attachment with forward keel beam 78 of fuselage portion 18A; one or more forward tension fittings 80 of wing unit 12 for attachment with one or more respective floor beams 82 supporting cabin floor 60 of fuselage portion 18A; upper portions of fence skins 46 of wing unit 12 for attachment with respective stringers 68 of fuselage portion 18A and fence frames 48 of wing unit 12 for attachment with respective fuselage frames 66.

In some embodiments, some or all of the joining locations between wing unit 12 and fuselage portion 18A may be disposed outside of wing unit 12 so that the need for assembly personnel to physically access the interior of wing unit 12 during structural assembly of wing unit 12 with fuselage assembly 18A may be reduced or eliminated. Additionally, some of the joining locations between pressure fences 28A, 28B may be disposed above cabin floor 60 of fuselage portion 18A to further facilitate access to such joining locations. The joining locations disclosed herein may facilitate the structural assembly process and also promote a shorter assembly time.

In various embodiments, the first interface may accommodate positional adjustment to achieve pitch adjustment of wing unit 12 relative to fuselage portion 18A. For example, aft tension fitting(s) 74, located at an aft portion of wing unit 12 may permit vertical adjustment of a forward portion of wing unit 12 along arrow P within a predetermined tolerance for the purpose of achieving pitch adjustment. Such pitch adjustment may be achieved by causing some rotation or pivoting movement of wing unit 12 about tension fitting(s) 74 for example. In some embodiments, the first interface may be configured to additionally or instead accommodate positional yaw and/or roll adjustment of wing unit 12 relative to fuselage portion 18A while wing unit 12 and fuselage portion 18A are unattached at the second interface.

In some embodiments one or more struts 84 may extend between floor beams(s) 82 and upper wing skin portion 34. Struts 84 may define respective load paths between upper wing skin portion 34 and the structure of fuselage portion 18A. Struts 84 may provide structural support for upper wing skin portion 34. In some embodiments, struts 84 may be distributed across the area of upper wing skin portion 34. In reference to the curvature of upper wing skin portion 34, at least some of upper wing skin portion 34 may be non-parallel to floor beam(s) 82.

Figure 9:
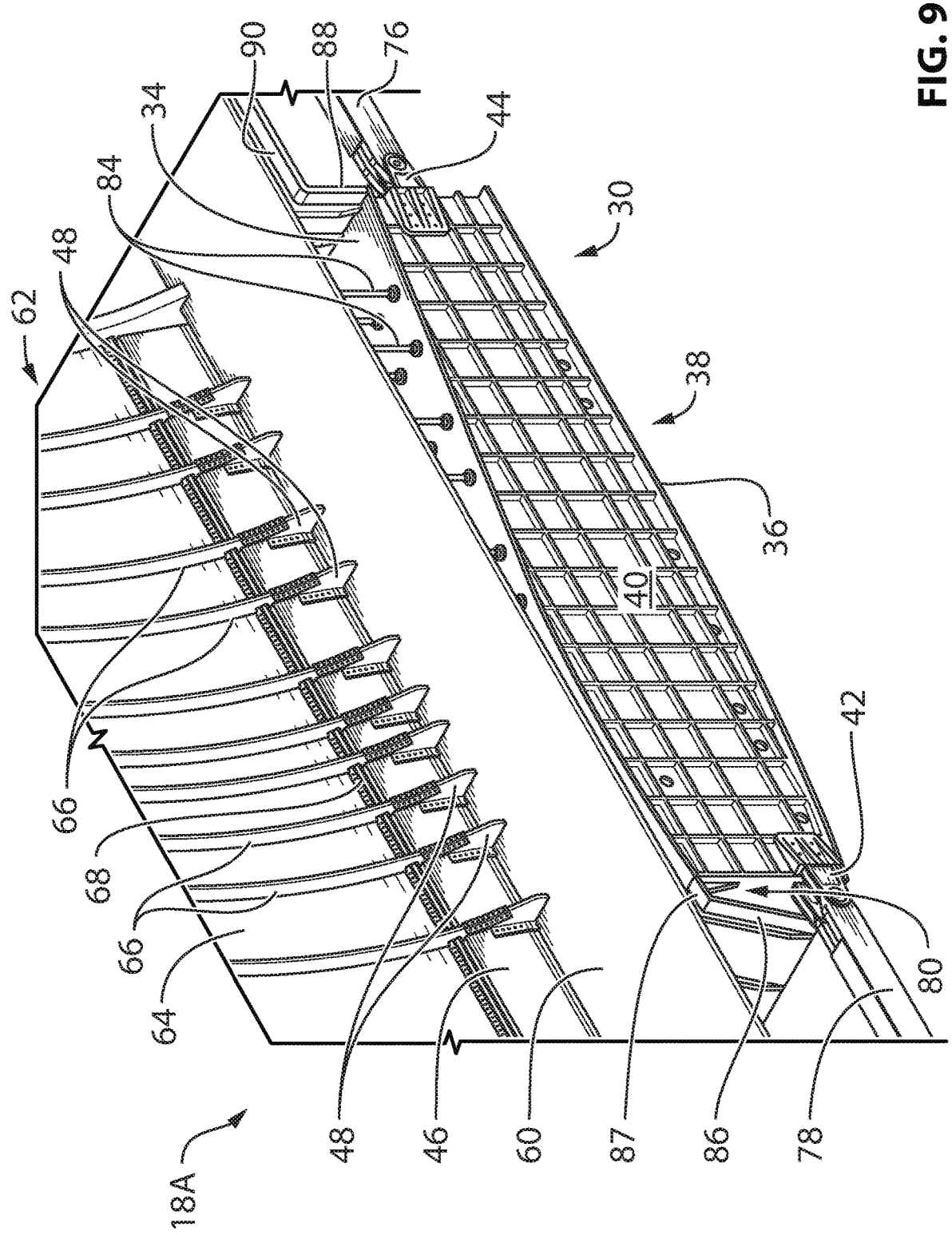
FIG. 9 is a perspective view of the axial cross-section through the fuselage portion and the wing unit.

FIG. 9 is perspective view of an axial cross-section through fuselage portion 18A and wing unit 12. The pressure vessel defined around passenger cabin 62 in fuselage portion 18A may be partially defined by fuselage skin 64, forward pressure wall 86, forward pressure floor 87, upper wing skin portion 34 of wing unit 12, fence skins 46, aft pressure wall 88 and aft pressure floor 90. Upper wing skin portion 34 may serve as a pressure floor to such pressure vessel instead of requiring a separate pressure floor to be disposed above upper wing skin portion 34. Joining locations between upper wing skin portion 34 and forward pressure wall 86 and between upper wing skin portion 34 and aft pressure wall 88 may comprise fay surface sealant to achieve suitable sealing for withstanding pressurization of passenger cabin 62. The region that is shown forward of forward pressure wall 86 may be a cargo compartment of aircraft 10.

Figure 10:
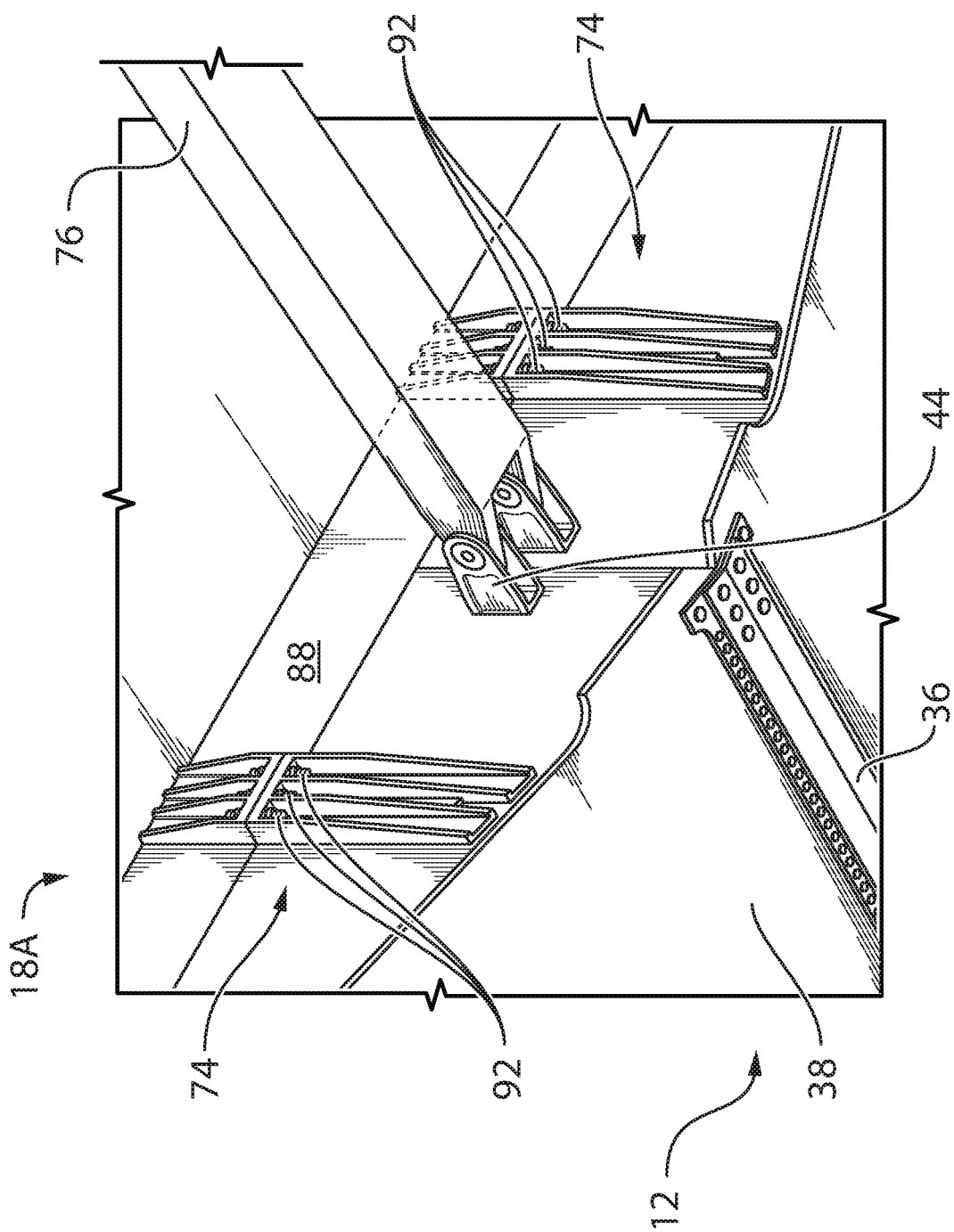
FIG. 10 is perspective view of an aft portion of the wing unit assembled with the fuselage portion.

FIG. 10 is perspective view of an aft portion of wing unit 12 assembled with fuselage portion 18A. In some embodiments, wing unit 12 may comprise two aft tension fittings 74 serving as the first interface to provide initial attachment of wing unit 12 to fuselage portion 18A. Aft tension fittings 74 may each be part of a bolted joint for attaching an aft portion of wing unit 12 to aft pressure wall 88 of fuselage portion 18A using bolts 92. In some embodiments, aft tension fittings 74 may be disposed on opposite lateral sides of longitudinal axis LA of the fuselage portion 18A. In some embodiments, aft tension fittings 74 may be disposed at equal lateral distances from longitudinal axis LA.

In some embodiments, both aft tension fittings 74 may be disposed at a substantially common longitudinal position relative to longitudinal axis LA. The longitudinal alignment of both aft tension fittings 74 may effectively define a hinge line about which pitch adjustment of wing unit 12 may be made within predetermined tolerances when wing unit 12 and fuselage portion 18A are attached at aft tension fittings 74 but are unattached at the other joining locations of the second structural interface.

Aft keel beam fitting 44 may be part of the second interface which is finished after relative positional adjustment between wing unit 12 and fuselage portion 18A. A suitable fastener such as a bolt or pin may be used to attach aft keel beam fitting 44 to aft keel beam 76. In some embodiments, one or more holes for receiving the fastener may be pre-finished in aft keel beam fitting 44 and may be used as a guide for finishing (e.g., drilling, reaming) corresponding one or more holes in aft keel beam 76 after the relative positional adjustment between wing unit 12 and fuselage portion 18A to ensure acceptable alignment. Alternatively, one or more holes for receiving the fastener may be pre-finished in aft keel beam fitting 46 and may be used as a guide for finishing (e.g., drilling, reaming) corresponding one or more holes in aft keel beam fitting 44 after the relative positional adjustment between wing unit 12 and fuselage portion 18A to ensure acceptable alignment.

Forward keel beam fitting 42 (shown in FIG. 9) may also be part of the second interface and may be configured similarly to aft keel beam fitting 44. Accordingly, forward keel beam fitting 42 may be attached to forward keel beam 78 in the same or in a similar manner as aft keel beam fitting 44 is attached to aft keel beam 76.

Figure 11B:
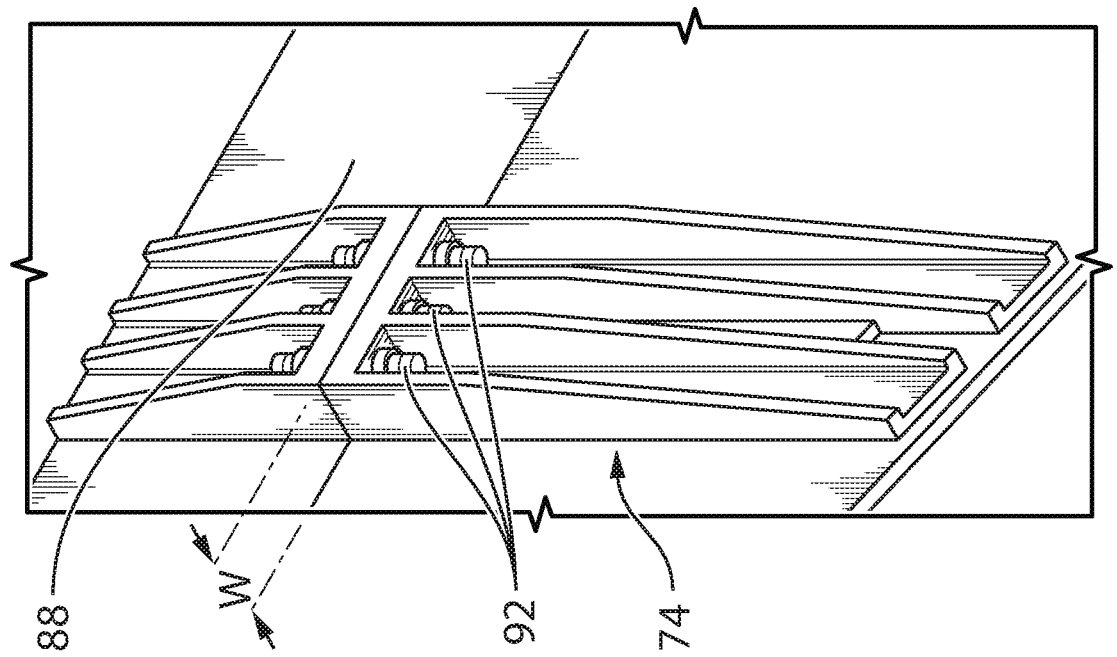
FIG. 11B is a perspective view showing the aft tension fitting of FIG. 11A in a fully assembled configuration.
Figure 11A:
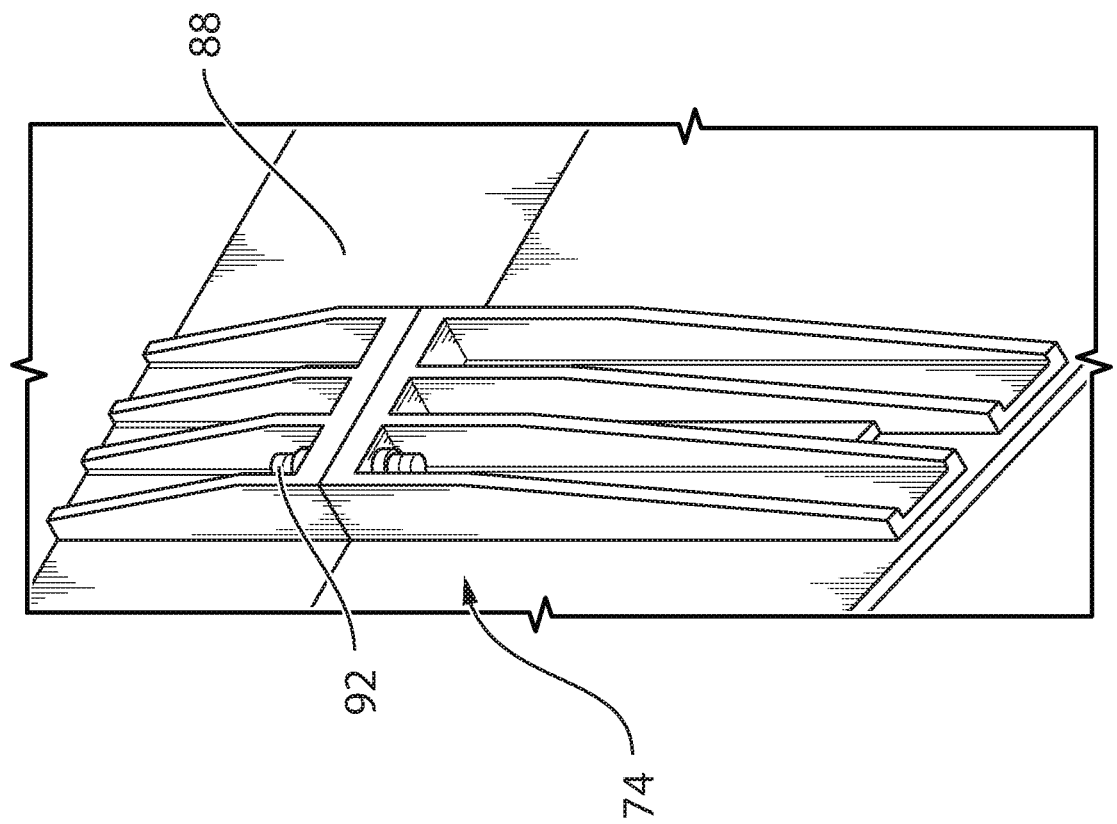
FIG. 11A is a perspective view showing an exemplary aft tension fitting of the wing unit permitting relative positional adjustment between the wing unit and the fuselage portion.

FIG. 11A shows a bolted joint between wing unit 12 and fuselage portion 18A comprising aft tension fitting 74, in a configuration permitting relative positional adjustment between wing unit 12 and fuselage portion 18A. FIG. 11B shows the bolted joint of FIG. 11A in a fully assembled configuration. In the fully assembled configuration of FIG. 11B where wing unit 12 and fuselage portion 18A are completely assembled together in their in-use configuration, each bolted joint may comprise one or more (e.g., three) bolts 92 that are torqued to their respective final torque values. However, in the adjustment configuration shown in FIG. 11A, the one or more bolts 92 may be torqued to respective values that are lower than their respective final torque values. In some embodiments, such lower torque values may be about 10% of the respective final torque values.

In some embodiments, the adjustment configuration of FIG. 11A may include fewer bolts 92 than the final configuration of FIG. 11B. For example, in the adjustment configuration, each aft tension fitting 74 may be fitted with only one (e.g., slave) bolt 92 to provide an initial point of attachment. In some embodiment, the hole formed in aft tension fitting 74 or in aft pressure wall 88 for receiving bolt 92 may be made slightly oversize relative to bolt 92 so as to provide an allowance for relative positional adjustment (e.g., pitch and yaw) between wing unit 12 and fuselage portion 18A. In this configuration, the holes for the other bolts 92 used in the final configuration may be absent or otherwise unfinished and may be finished at the suitable locations and orientations only after the positional adjustment.

The use of aft tension fittings 74 in the adjustment configuration of FIG. 11A may facilitate the relative positional adjustment between wing unit 12 and fuselage assembly 18A using wing supports 26 and fuselage supports 24 (shown in FIG. 2) by providing an initial attachment point between wing unit 12 and fuselage assembly 18A that anchors the two assemblies together yet that also accommodates relative positional adjustment.

In order to facilitate pitch adjustment, an interfacing contact area in the bolted joints at aft tension fitting 74 may be relatively small relative to a chord length of wing unit 12 where the chord refers to an imaginary straight line joining the leading and trailing edges of wing 14A and/or wing 14B. For example, in some embodiments, a width W of such contact area may be about 1% of a maximum chord length of wing unit 12. In some embodiments, the width W of the contact area may be less than about 1% of the maximum chord length of wing unit 12. In some embodiments, the width W of the contact area may be less than about 3% of the maximum chord length of wing unit 12. In some embodiments, the width W of the contact area may be between about 1% and about 3% of the maximum chord length of wing unit 12. In some embodiments, the width W of the contact area may be less than 5% of the maximum chord length of wing unit 12. In some embodiments, the width W of the contact area may be between about 1% and about 5% of the maximum chord length of wing unit 12.

Roll positional adjustment of wing unit 12 relative to fuselage portion 18A may comprise shimming interfacing contact areas of the one or more bolted joints comprising aft tension fittings 74. For example, the laterally-opposed positions of the two aft tension fittings 74 relative to longitudinal axis LA may facilitate such roll positional adjustment.

Figure 12A:
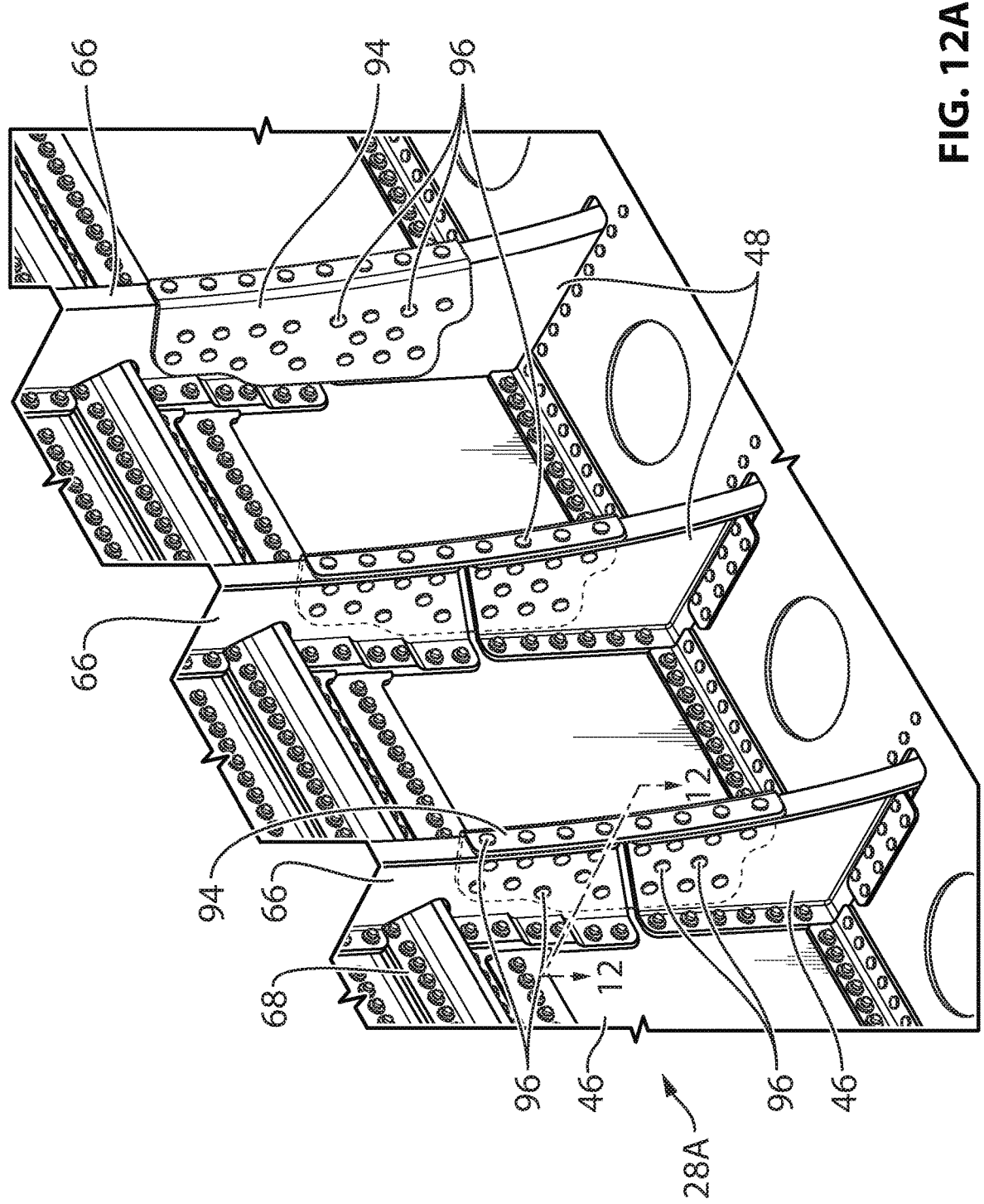
FIG. 12A is a perspective view of an exemplary joint between a pressure fence of the wing unit and the fuselage portion.

FIG. 12A is a perspective view of exemplary splice joints between fence frames 48 of wing unit 12 and fuselage frames 66 of fuselage portion 18A. These joints may each comprise frame splice 94 overlapping both fence frames 48 and fuselage frames 66 and may be secured to fence frames 48 and fuselage frames 66 by way of suitable fasteners 96. These splice joints may be part of the second interface which is finished after relative positional adjustment between wing unit 12 and fuselage portion 18A. In some embodiments, one or more holes for receiving fasteners 96 may initially be unfinished and may only be finished (e.g., drilled) after the relative positional adjustment between wing unit 12 and fuselage portion 18A to ensure suitable alignment.

FIG. 12B is a perspective cross-sectional view taken along line 12-12 of FIG. 12A extending through splice 94 and fuselage frame 66.

Figure 13:
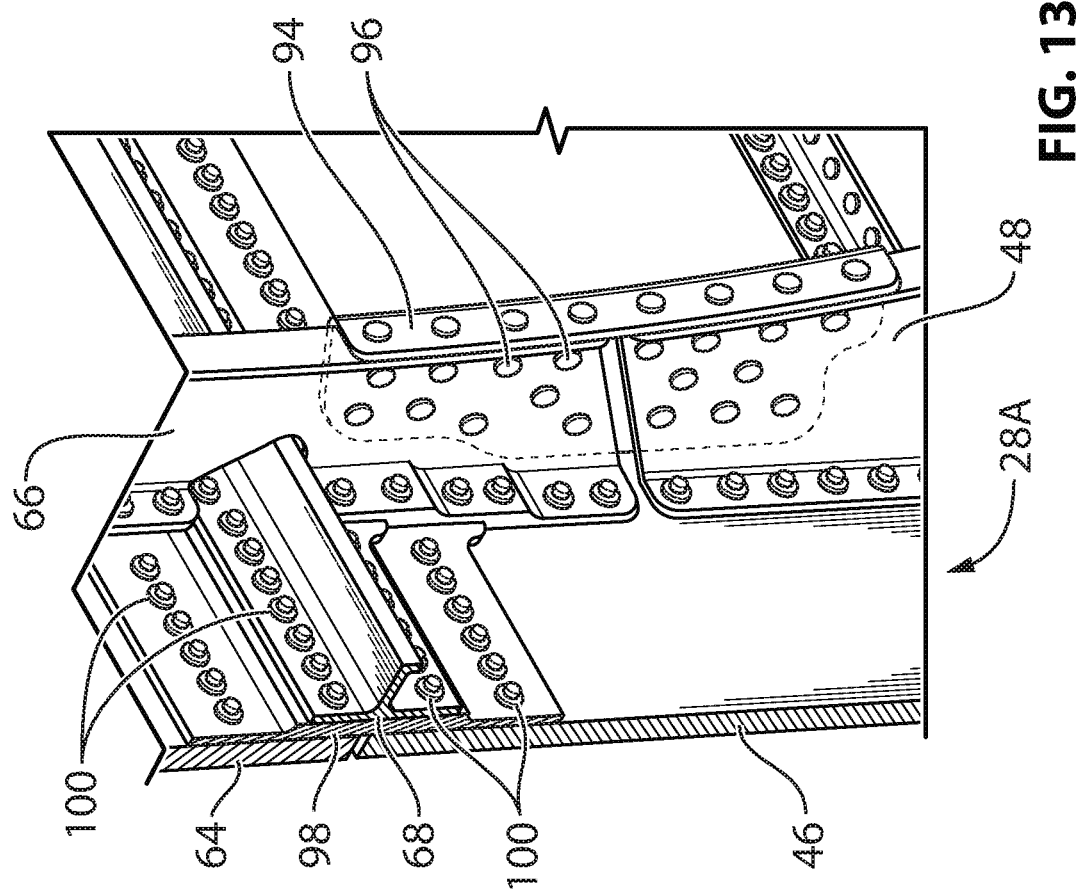
FIG. 13 is a perspective cross-sectional view through another exemplary joint between the pressure fence of the wing unit and the fuselage portion.

FIG. 13 is a perspective cross-sectional view through an exemplary joint between fence skin 46 of wing unit 12 and stringer 68 of fuselage portion 18A. The cross-section of FIG. 13 is taken transversely to stringer 68. An upper portion of fence skin 46 may be attached to stringer 68, which may be disposed above cabin floor 60 (see FIGS. 7A and 7B). This joint may also comprise a splice joint between fuselage skin 64 and fence skin 46 where skin splice 98 may overlap both fuselage skin 64 and fence skin 46 and may be secured to both fuselage skin 64 and fence skin 46 by way of suitable fasteners 100 extending through stringer 68, through skin splice 98 and through fuselage skin 64 or fence skin 46. This joint may also be part of the second interface which is finished after relative positional adjustment between wing unit 12 and fuselage portion 18A. In some embodiments, one or more holes for receiving fasteners 100 may initially be unfinished and may only be finished (e.g., drilled) after the relative positional adjustment between wing unit 12 and fuselage portion 18A to ensure suitable alignment.

Figure 14:
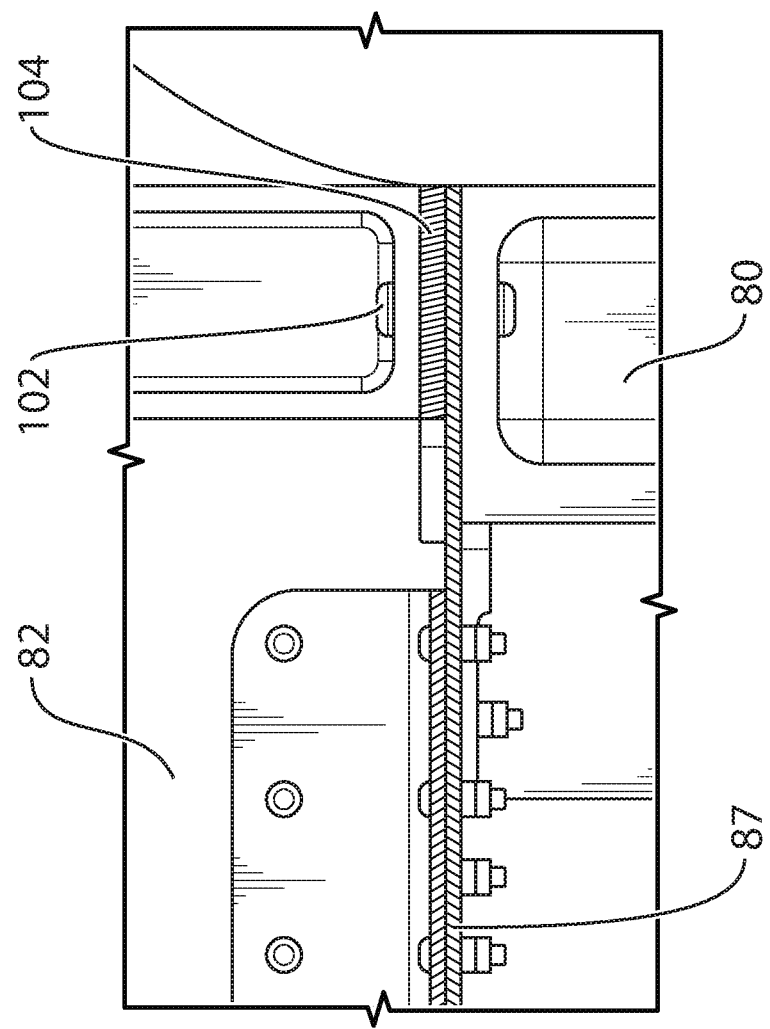
FIG. 14 is a perspective view showing an exemplary forward tension fitting of the wing unit for attaching the wing unit to the fuselage portion.

FIG. 14 is a perspective view showing an exemplary forward tension fitting 80 of wing unit 12 for attaching a forward portion of wing unit 12 to floor beam 82. It is understood that wing unit 12 may comprise a plurality of such forward tension fittings 82 for attachment to a plurality of respective floor beams 82 using fastener 102. In some embodiments, forward pressure floor 87 may be disposed between forward tension fitting 80 and floor beam 82 and fastener 102 may also extend through forward pressure floor 104. In some embodiments, suitable shims 104 may also be disposed between forward tension fitting 80 and floor beam 82.

This joint may also be part of the second interface which is finished after relative positional adjustment between wing unit 12 and fuselage portion 18A. In some embodiments, one or more holes for receiving fasteners 102 may initially be unfinished and may only be finished (e.g., drilled) after the relative positional adjustment between wing unit 12 and fuselage portion 18A to ensure suitable alignment. This joint may may comprise fay surface sealant to achieve suitable sealing for withstanding pressurization of passenger cabin 62.

Figure 15:
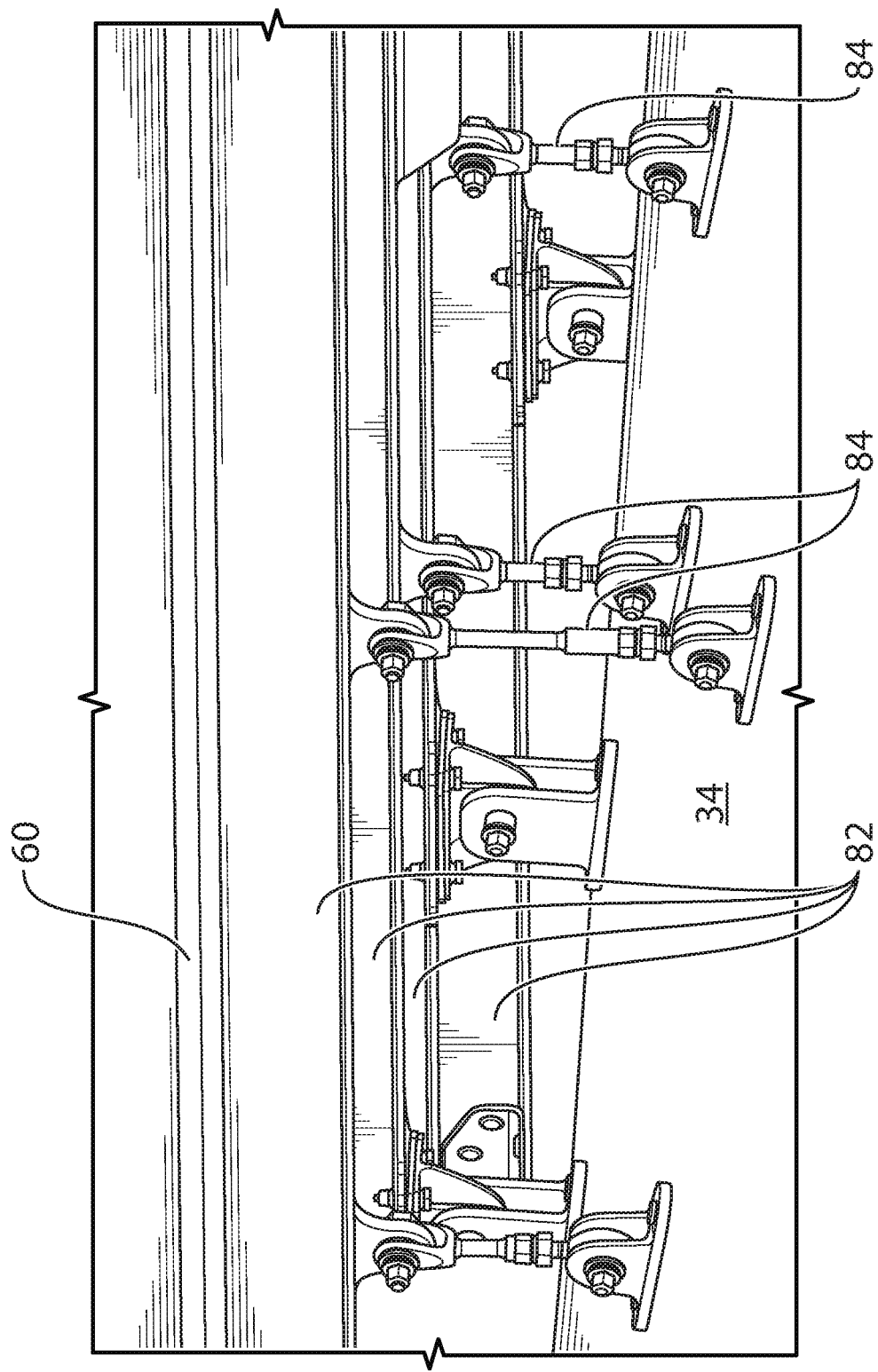
FIG. 15 is a perspective view of an exemplary upper wing skin portion of the wing unit in relation to floor beams of the fuselage portion.

FIG. 15 is a perspective view of upper wing skin portion 34 of wing unit 12 in relation to floor beams 82 of fuselage portion 18A. Struts 84 may be installed after the relative positional adjustment between wing unit 12 and fuselage portion 18A. Struts 84 may define respective load paths between upper wing skin portion 34 and floor beams 82. Struts 84 may be distributed across the area of upper wing skin portion 34. Struts 84 may comprise turnbuckles or otherwise permit lengthwise adjustment of struts 84 to facilitate installation.

FIG. 16 is a perspective view of an exterior of the pressure fence 28A when wing unit 12 and fuselage portion 18A are assembled together. In some embodiments one or more additional skin splices such as cruciform doubler 106 may be used to attach fence skin 46 to fuselage skin 64. When aircraft 10 is fully assembled and ready for service, the region of the root of wing 14A including fence skin 46 may be covered by suitable aerodynamic fairing(s) so that such additional skin splices applied to the exterior of fence skin 46 may not affect aerodynamic performance.

FIG. 17 is a flowchart illustrating an exemplary method 2000 for assembling wing unit 12 with fuselage portion 18A. It is understood that the execution of method 2000 is not limited to the specific exemplary construction of wing unit 12 and fuselage portion 18A disclosed herein. In various embodiments, method 2000 may comprise:

attaching fuselage portion 18A and wing unit 12 together at a first structural interface (e.g., aft tension fittings 74) between fuselage portion 18A and wing unit 12 (see block 2002), the first structural interface being configured to permit relative positional adjustment between wing unit 12 and fuselage portion 18A;

while fuselage portion 18A and wing unit 12 are attached at the first structural interface and while fuselage portion 18A and wing unit 12 are unattached at an unfinished second structural interface, performing relative positional adjustment between wing unit 12 and fuselage portion 18A (see block 2004);

after the relative positional adjustment between wing unit 12 and fuselage portion 18A, finishing the second structural interface between fuselage portion 18A and the wing unit 12 (see block 2006) while wing unit 12 and fuselage portion 18A are in their adjusted configuration; and attaching the fuselage portion and the wing unit at the second structural interface after finishing the second structural interface (see block 2008).

In some embodiments, wing unit 12 may be temporarily moved away from fuselage portion 18A (or fuselage portion 18A may be temporarily moved away from wing unit 12) after finishing of the second structural interface and before attaching fuselage portion 18A and wing unit 12 at the second structural interface (i.e., between blocks 2006 and 2008). This temporary movement may require detachment of first structural interface (e.g., aft tension fittings 74) so that wing unit 12 may be moved far enough away from fuselage portion 18A to permit deburring of newly drilled holes and also the application of fay surface sealant to some of the joining surfaces for example. Wing unit 12 and fuselage portion 18A may then be brought back together to be attached at both the first interface and at the second interface in their fully-assembled configuration.

In various embodiments, the relative positional adjustment may comprise a pitch adjustment, a yaw adjustment and/or a roll adjustment of wing unit 12 relative to fuselage portion 18A.

In some embodiments, attaching fuselage portion 18A and wing unit 12 at the first structural interface may comprise torqueing a bolted joint of the first structural interface to a value that is less than (e.g., 10% of) a final torque value of the bolted joint. The relative positional adjustment may comprise rotating wing unit 12 about the first structural interface.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft structural assembly comprising:
   a fuselage portion partially defining a pressure vessel containing a passenger cabin including a cabin floor, the fuselage portion comprising one or more fuselage frames and a fuselage skin supported by the one or more fuselage frames; and
   a wing unit attached to the fuselage portion the wing unit comprising:
      a first wing extending in a first lateral direction relative to the fuselage portion and a second wing extending in an opposite second lateral direction relative to the fuselage portion;
      a first pressure fence attached to the first wing, the first pressure fence defining a first part of the pressure vessel partially defined by the fuselage portion, the first pressure fence being attached to the fuselage portion at a first joining location that is disposed vertically above the cabin floor; and
      a second pressure fence attached to the second wing, the second pressure fence defining a second part of the pressure vessel partially defined by the fuselage portion,
      the second pressure fence being attached to the fuselage portion at a second joining location that is disposed vertically above the cabin floor,
   wherein:
      the first pressure fence comprises a first fence skin and the second pressure fence comprises a second fence skin;
      the first fence skin extends upwardly relative to an upper wing skin of the first wing and also in the first lateral direction;
      the second fence skin extends upwardly relative to the upper wing skin of the second wing and also in the second lateral direction;
      an upper portion of the first fence skin is attached to a first stringer of the fuselage portion and an upper portion of the second fence skin is attached to a second stringer of the fuselage portion;
      the first and second stringers are disposed vertically above the cabin floor of the fuselage portion;
      the first and second stringers and the first and second fence skins extend along a longitudinal axis of the fuselage portion; and
      the first pressure fence and the second pressure fence cooperatively define a cradle into which part of the fuselage portion is received, wherein:
         a first surface of the upper portion of the first fence skin abuts a portion of a surface of the fuselage skin in a first contact area;
         a portion of a second surface of the upper portion of the first fence skin abuts a portion of a surface of a fuselage frame from the one or more fuselage frames in a second contact area, the second contact area being at an angle from the first contact area; and
         the upper portion of the first fence skin protrudes upward to guide the fuselage frame for self-alignment in the first or second lateral direction between the fuselage portion and the first pressure fence upon being brought together.

2. The structural assembly as defined in claim 1, wherein:
   the first pressure fence comprises one or more first fence frames and the second pressure fence comprises one or more second fence frames;
   the one or more first fence frames and the one or more second fence frames are attached to the respective fuselage frames; and
   the one or more first fence frames and the one or more second fence frames extend vertically above the cabin floor of the fuselage portion.

3. The structural assembly as defined in claim 1, wherein a portion of the upper wing skin defined by the first wing and the second wing defines a third part of the pressure vessel partially defined by the fuselage portion.

4. The structural assembly as defined in claim 1, wherein:
   the first pressure fence comprises one or more first fence frames supporting the first fence skin;
   the second pressure fence comprises one or more second fence frames supporting the second fence skin; and
   the one or more first fence frames and the one or more second fence frames are attached to the respective fuselage frames.

5. The structural assembly as defined in claim 1, wherein:
   the first fence skin and second fence skin respectively overlap the one or more fuselage frames.

6. The structural assembly as defined in claim 1, wherein an upper skin portion of the wing unit defines a third part of the pressure vessel partially defined by the fuselage portion.

* * * * *